April 9, 1946.  J. C. WILSON  2,398,268
MACHINE TOOL
Filed May 20, 1942  11 Sheets-Sheet 4
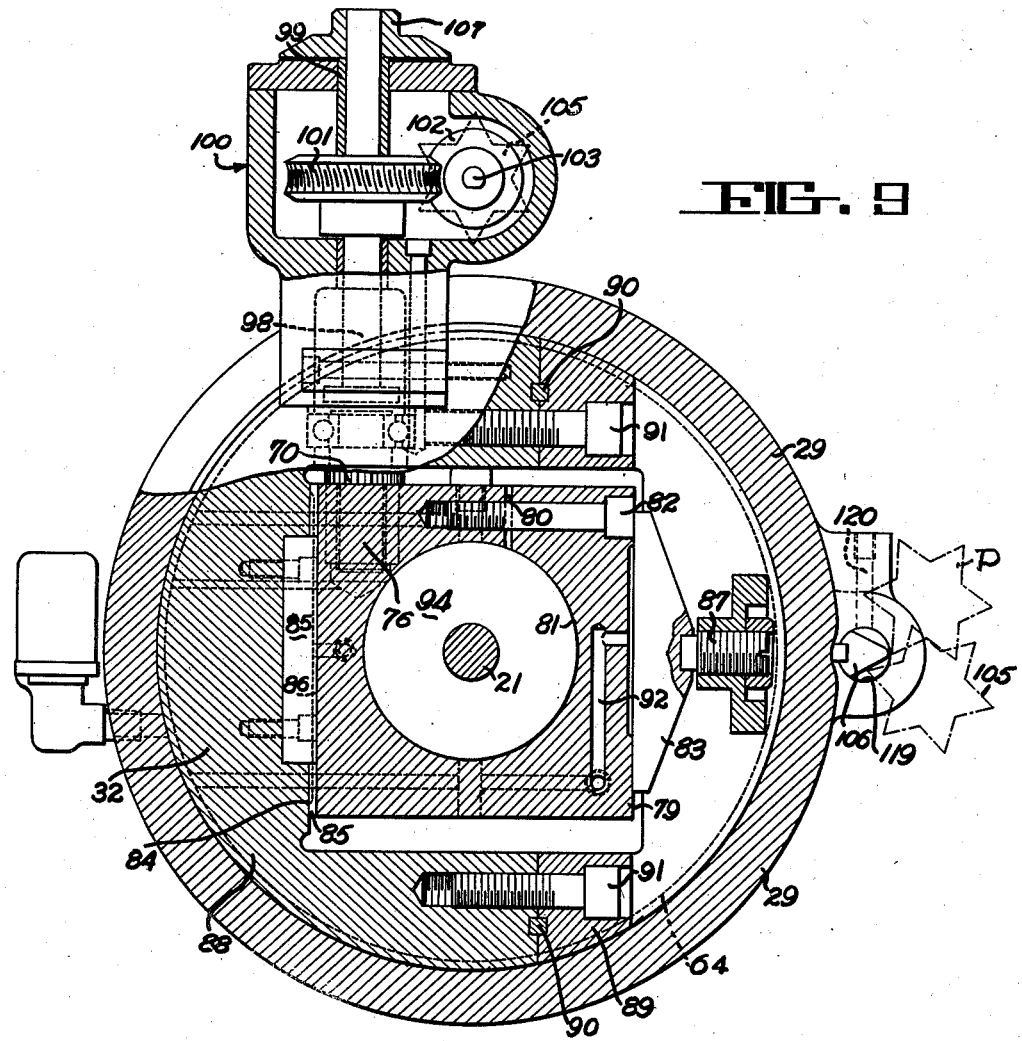
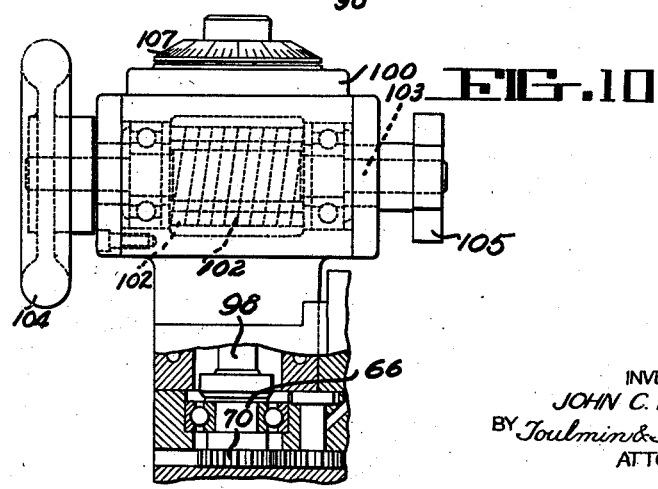
INVENTOR
JOHN C. WILSON
BY Toulmin & Toulmin
ATTORNEYS

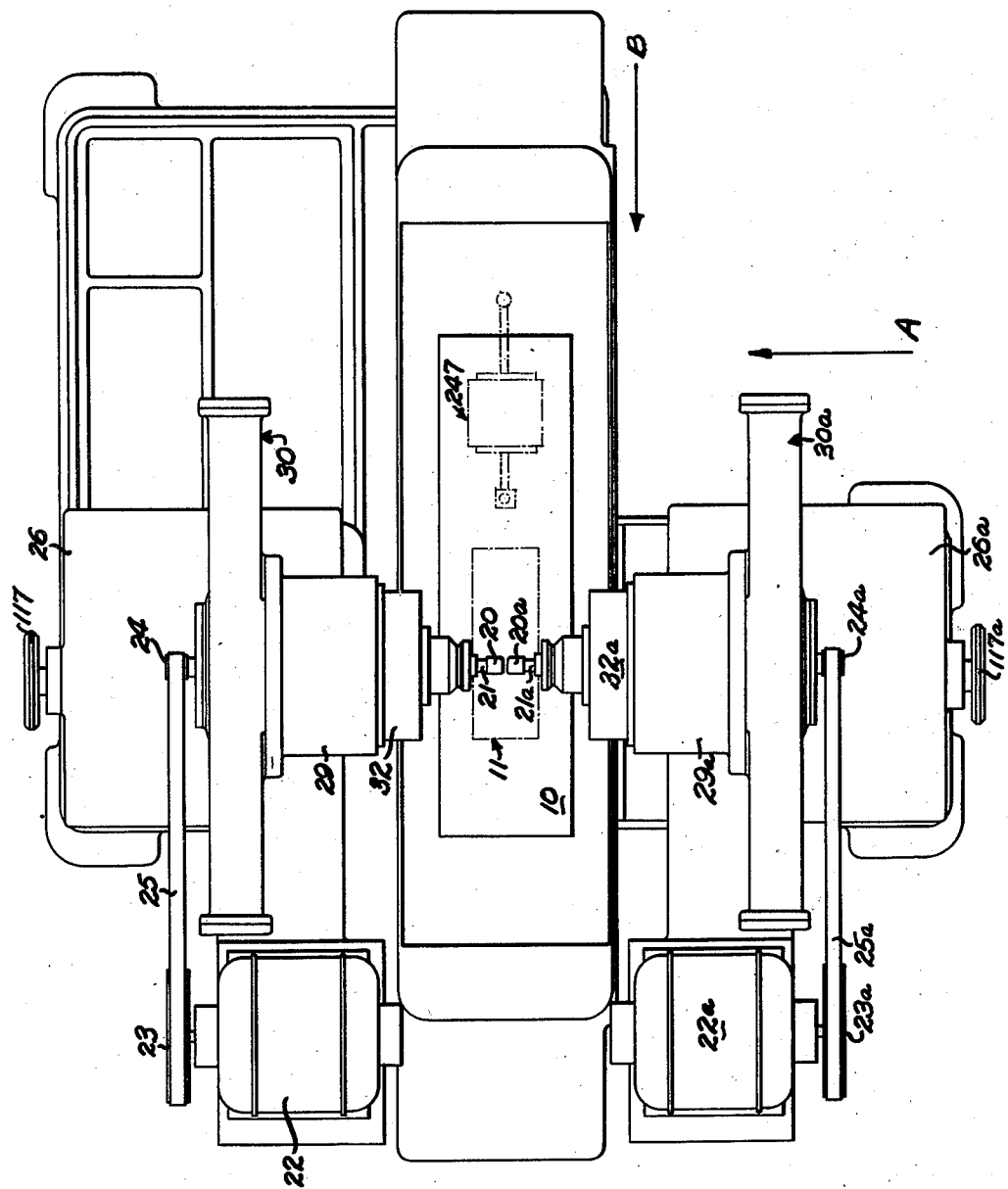

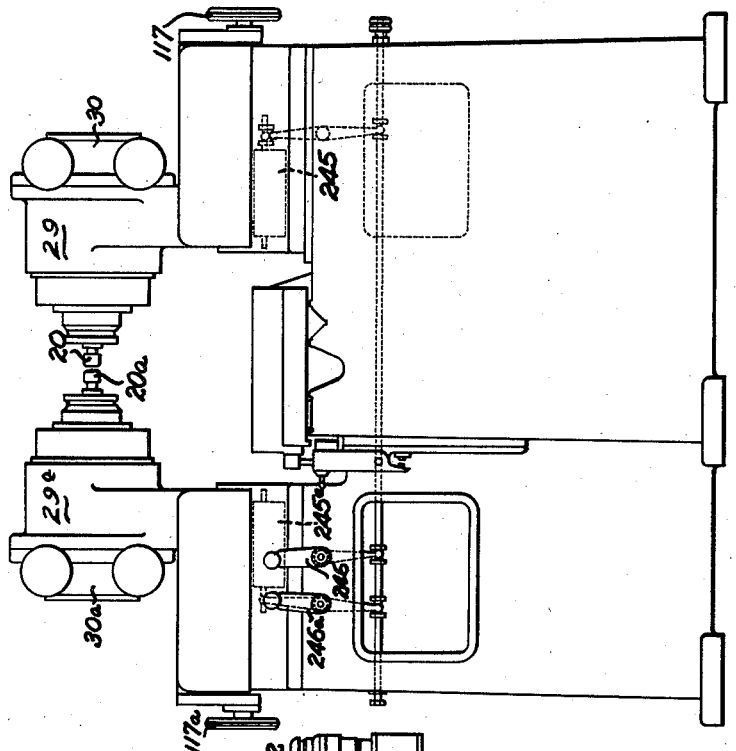
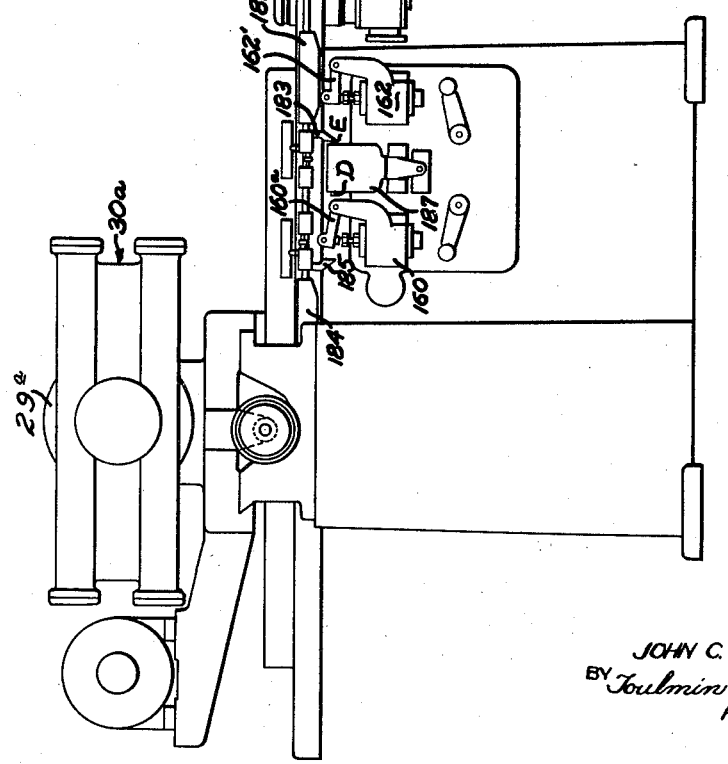

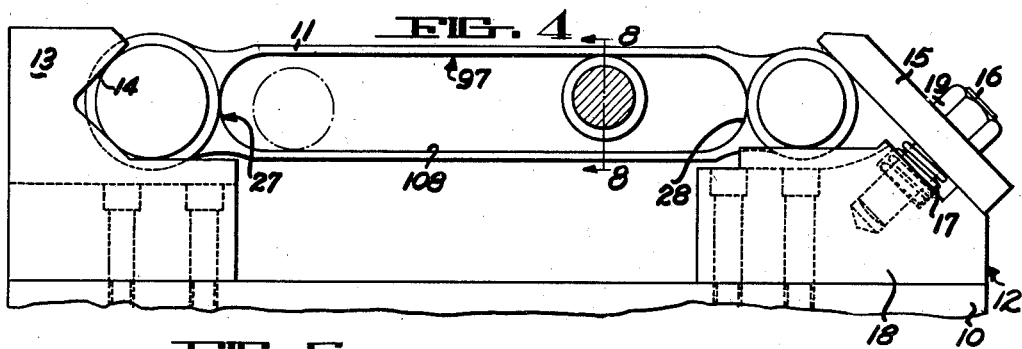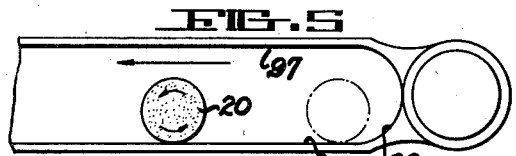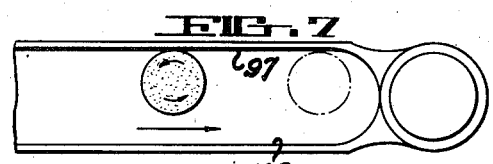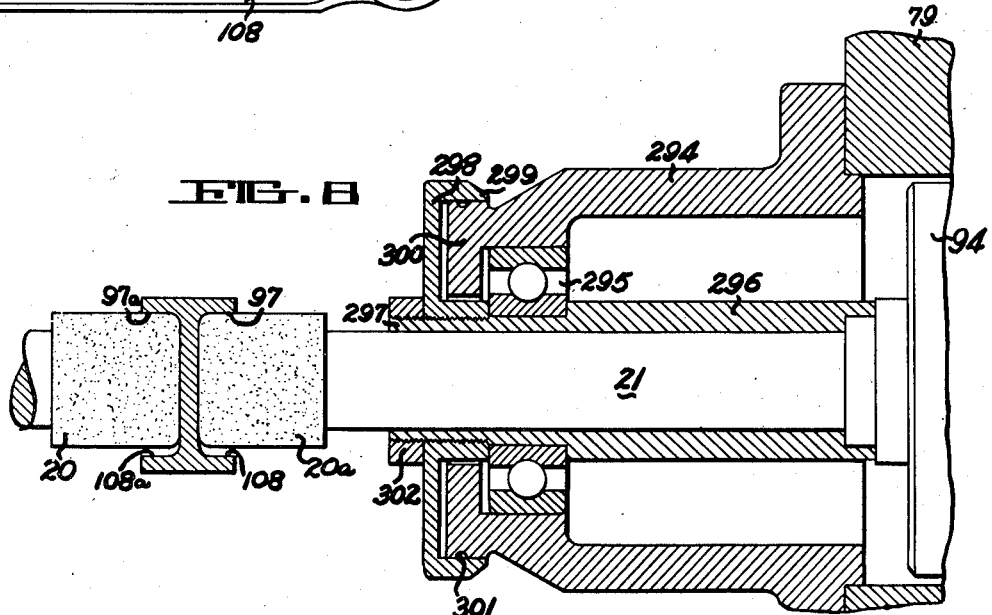

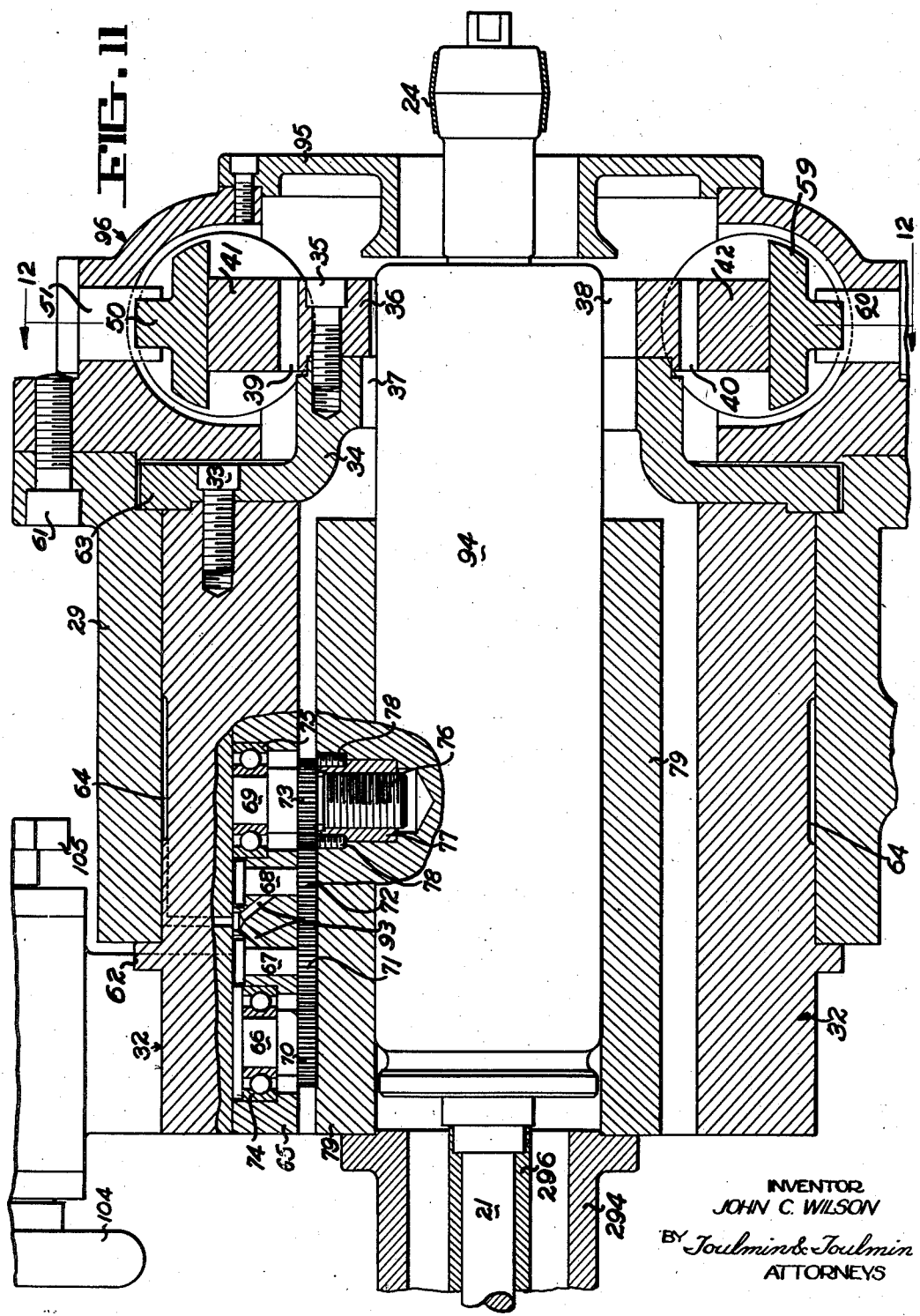

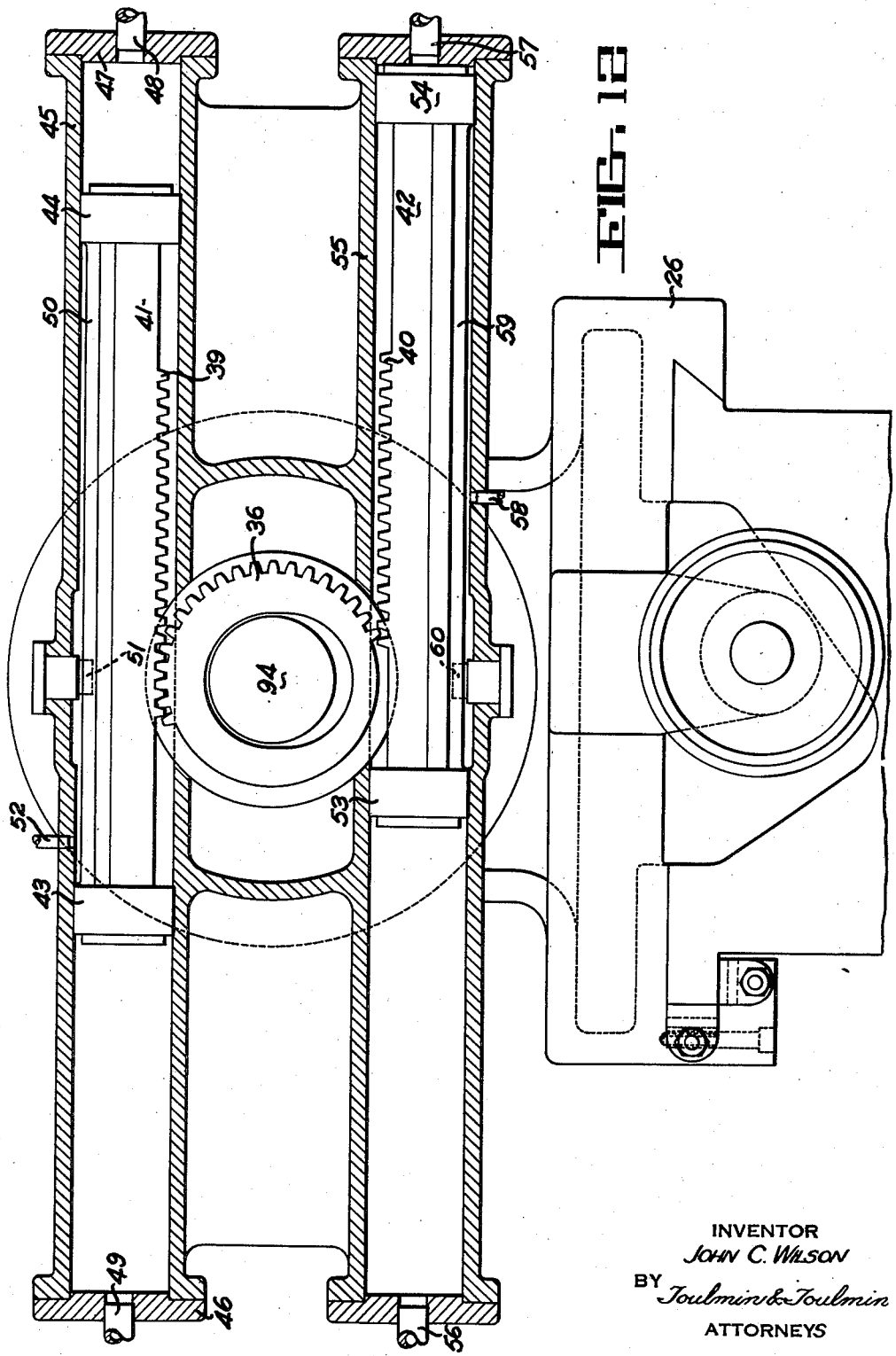

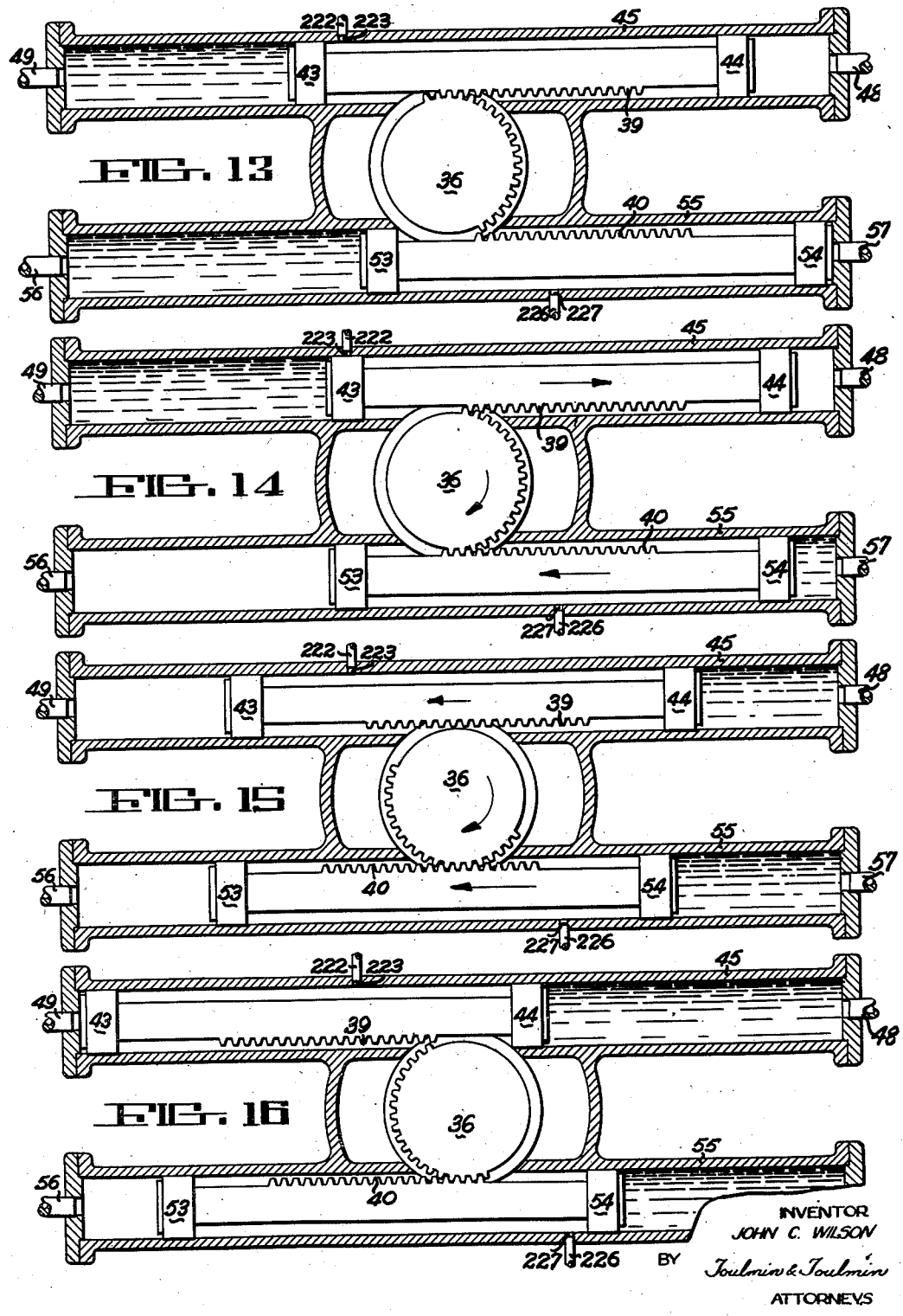

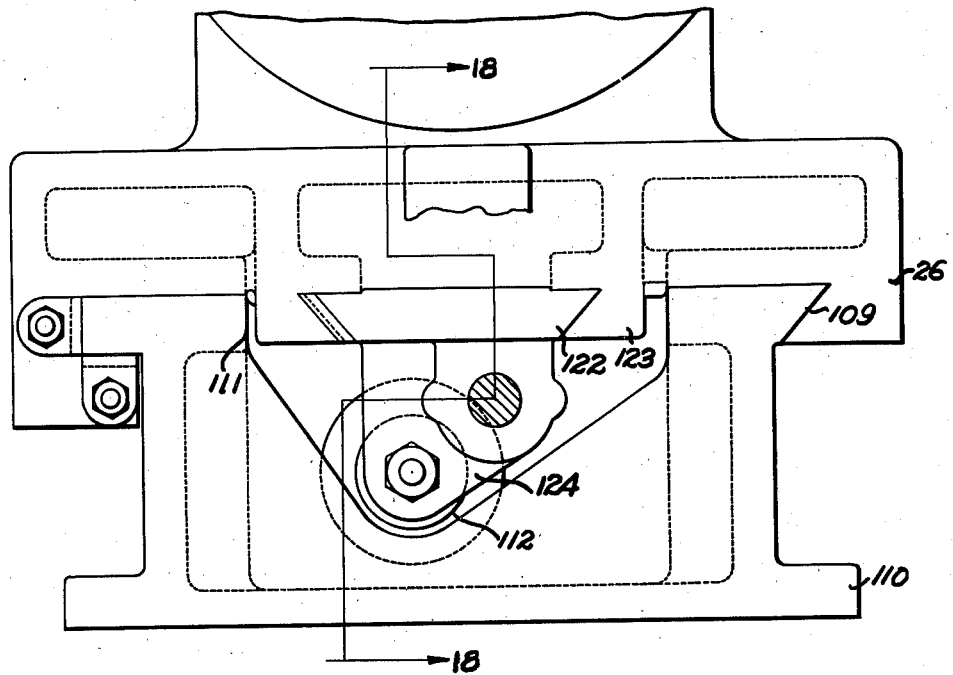
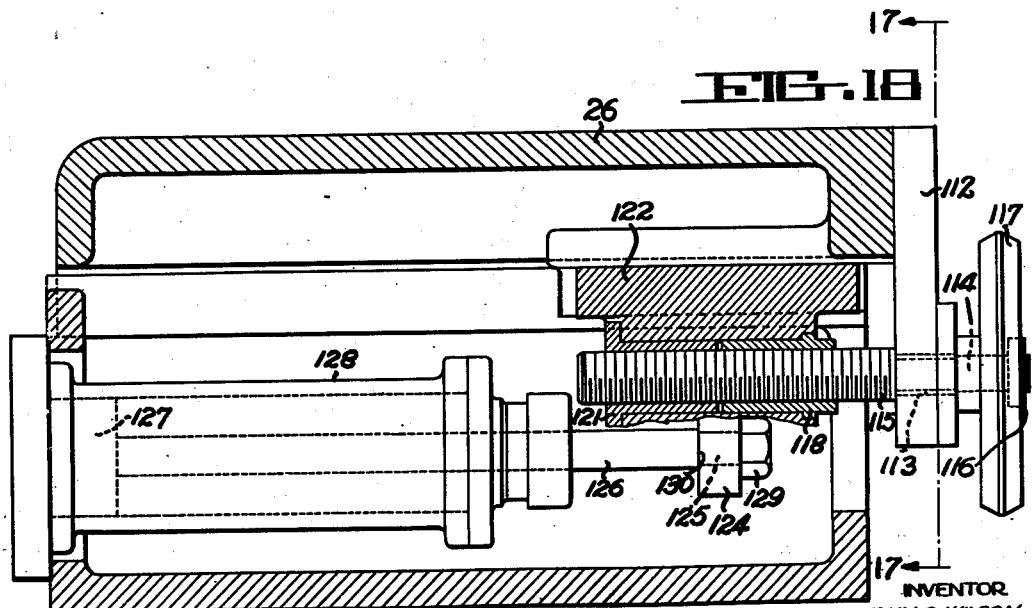

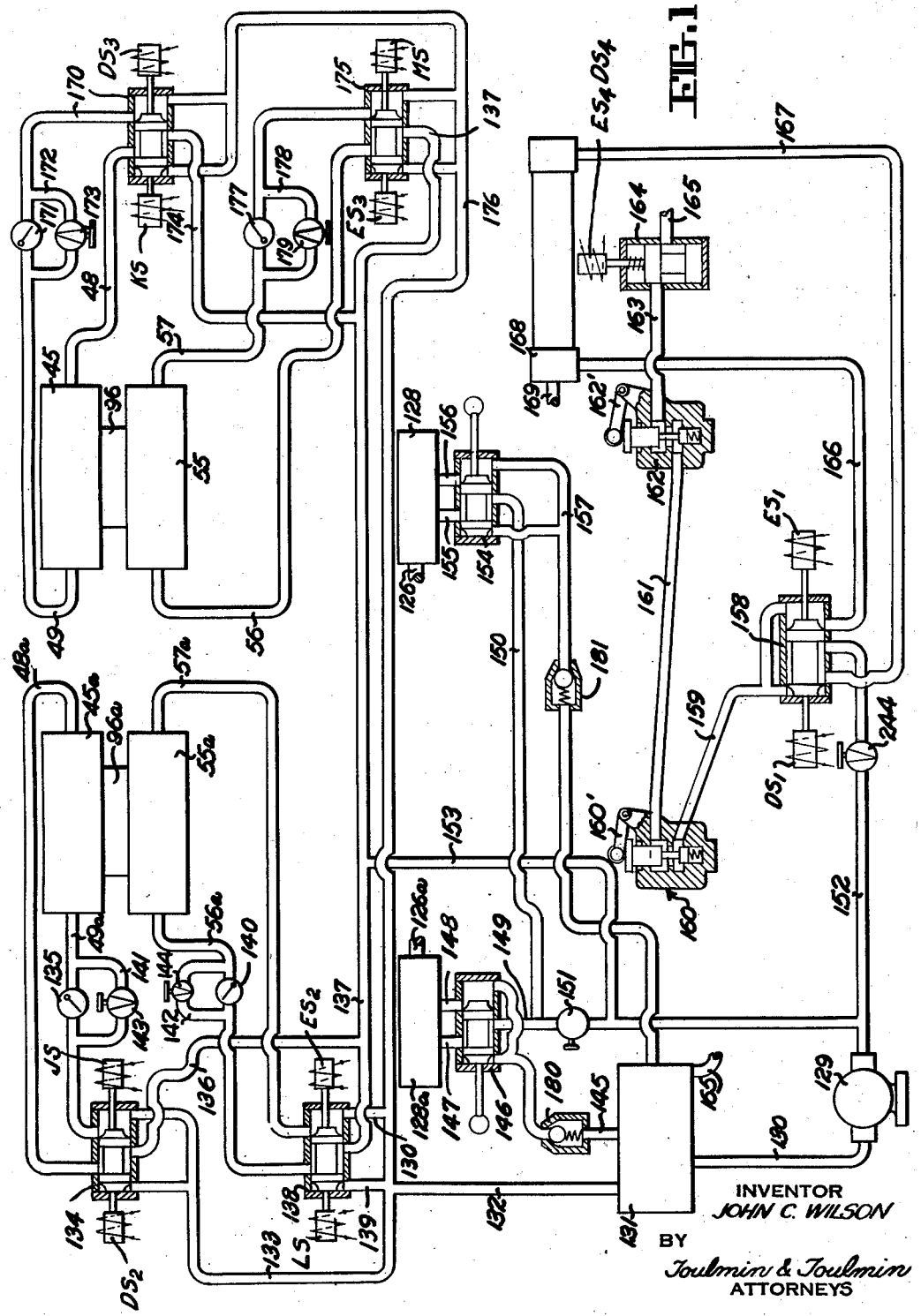

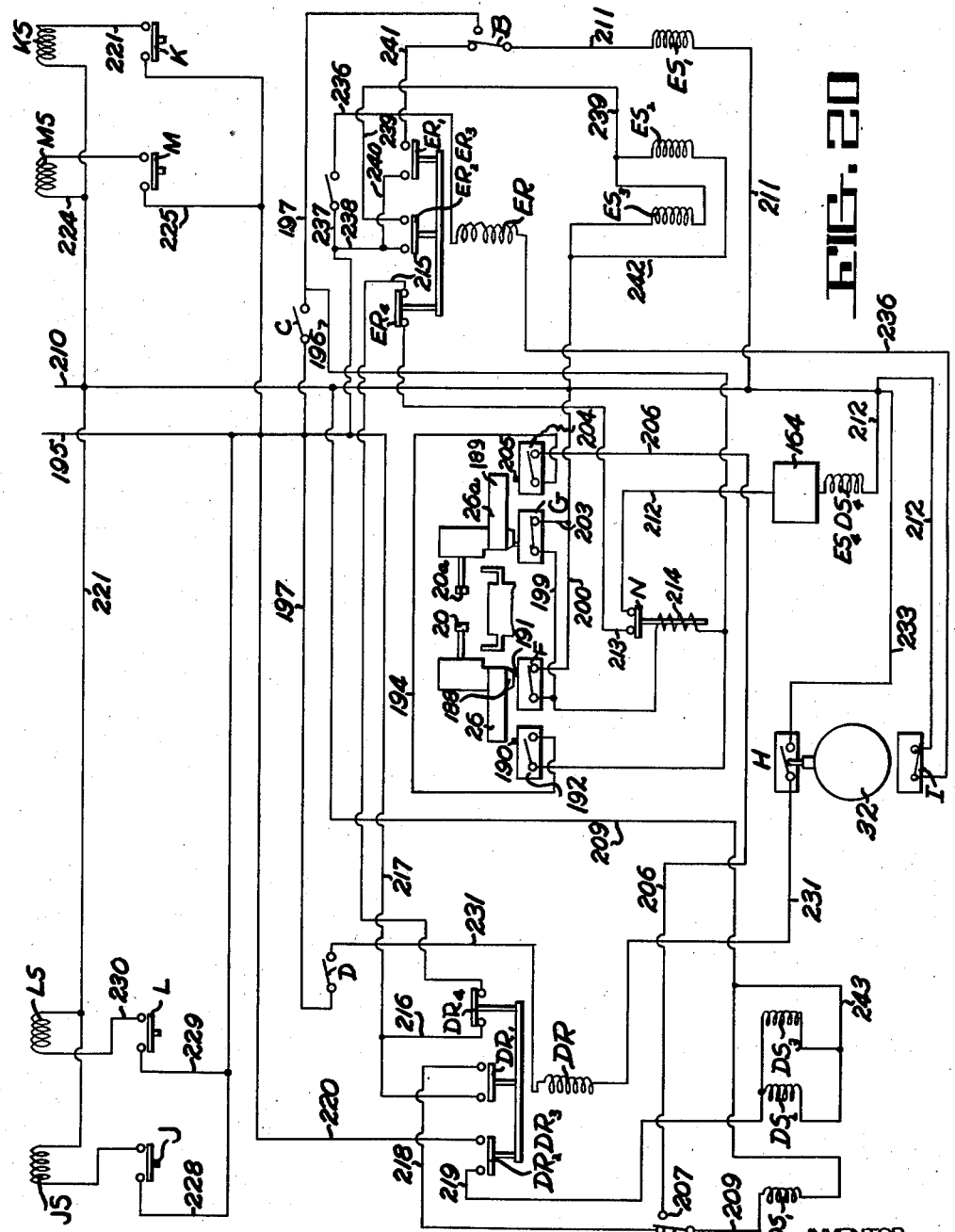

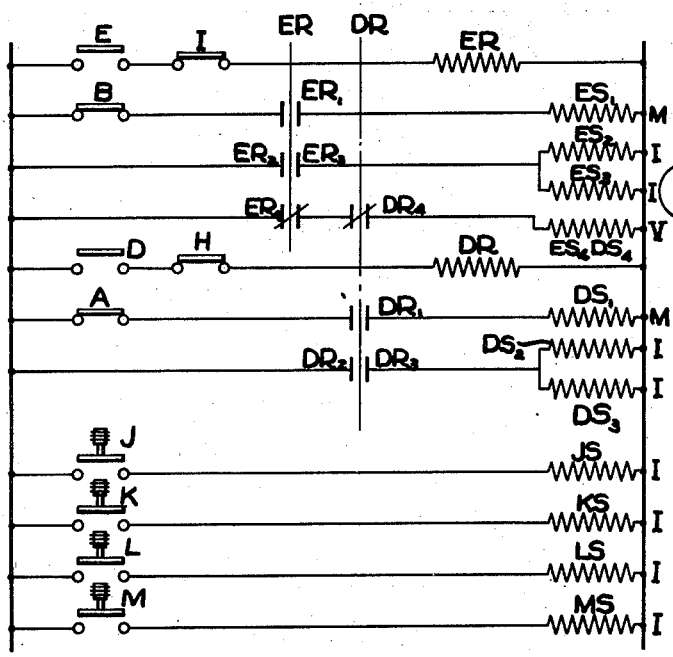
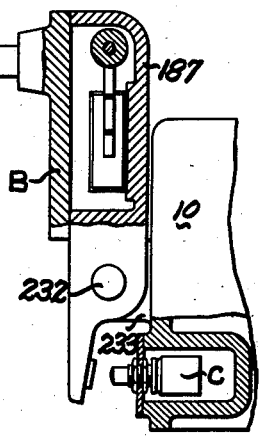
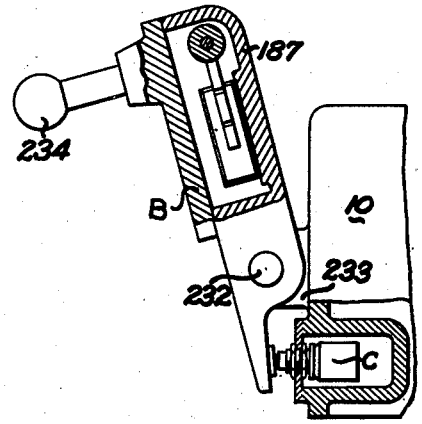

Patented Apr. 9, 1946

2,398,268

UNITED STATES PATENT OFFICE 2,398,268

MACHINE TOOL

John C. Wilson, Springfield, Ohio, assignor to The Thompson Grinder Company, Springfield, Ohio, a corporation of Ohio Application May 20, 1942, Serial No. 443,829

14 Claims. (Cl. 51—90)

This invention relates to machine tools and, in particular, to control means for use in connection with machine tools to control the proper relative movement between a work piece to be machined and the tool machining the said work piece.

It is an object of this invention to provide a control mechanism, particularly for use in connection with grinding machines and milling machines, which will make it possible automatically and very accurately to machine a surface composed of a straight and a curved portion, without resorting to a template.

It is another object to provide a control mechanism of the type set forth in the preceding paragraph, which is provided with means for varying the relative travel between the work piece to be machined and the machining tool.

It is a further object to provide a control mechanism for automatically controlling the tool holder of a machine tool so that the tool holder remains stationary during one portion of the working cycle while the work piece is being moved, and moves during another portion of the working cycle along a curved line, while the work piece is held stationary.

Another object of the invention consists in the provision of a machine tool for machining surfaces of closed contour with straight and curved surface portions merging with each other, in which the machining tool is eccentrically journalled with regard to a rotary member and moved along a curved portion in response to a rotation of said rotary member by a predetermined angle.

It is a still further object to provide a machine tool, in which the work piece is supported by a reciprocable table, the operation of which is automatically controlled during a complete cycle, while the machining tool for machining the work piece is likewise automatically controlled so as to be held stationary during the movement of said table, and to be moved along a predetermined curved line during a period between the end of one stroke of said table and the beginning of the next stroke thereof.

Still another object consists in the provision of a machine tool for machining surfaces of closed contour with straight and curved surface portions merging with each other, in which the work piece is moved relative to a machining tool, which latter is eccentrically journalled with regard to a rotary member and moved along a curved portion by a control mechanism associated with said rotary member in response to a predetermined stroke of said work piece.

It is a further object of the invention to provide a machine tool as set forth in the preceding paragraph, in which the control mechanism for moving the machining tool along a curved line is operated selectively either manually or automatically by hydromechanical means and controlled by electric means.

It is another object of the invention to provide a machine tool in which the tool holder holding the machining tool is provided with means for practically eliminating any swinging movement of the machining tool.

These and other objects and advantages of the invention will appear more clearly from the following specification in connection with the accompanying drawings, in which:

Figure 1 shows the grinding machine in operative position.

Figure 2 is a front view of the machine shown in Figure 1, seen in the direction of the arrow A.

Figure 3 is a side view of Figure 1, seen in the direction of the arrow B.

Figure 4 is an enlarged view of a work piece in position for being machined according to the invention.

Figures 5, 6 and 7 diagrammatically illustrate the relative movement of the work piece and a grinding wheel controlled according to the invention.

Figure 8 is a partial section along the line 8—8 of Figure 4, showing the simultaneous machining of two opposite sides of the work piece.

Figure 9 is a transverse section through the support for the machine tool.

Figure 10 shows, partially in view and partially in section, a detail of Figure 9.

Figure 11 is a longitudinal section through the support for the machining tool.

Figure 12 is a section along the line 12—12 of Figure 11.

Figures 13, 14, 15, and 16 diagrammatically illustrate the operation of the device shown in Figure 12.

Figure 17 is a section along the line 17—17 of Figure 18.

Figure 18 is a section along the line 18—18 of Figure 17.

Figure 19 illustrates the hydraulic control system for the device according to the invention.

Figure 20 illustrates the electric control circuit for the device according to the invention.

Figure 21 shows the circuit of Figure 20 in simplified form.

Figure 22 is an energizing chart, indicating the period during which the various solenoids are energized when the machine performs a working cycle.

Figure 23 shows a manually operable switch in open position, and

Figure 24 shows the switch of Figure 23 in closed position.

*General arrangement*

Referring now to the drawings in detail and to Figures 1 to 3 thereof in particular, the structure shown therein constitutes a grinding machine with a reciprocable table 10 for supporting a work piece, generally designated 11, and indicated in dot-dash lines in Figure 1. The work piece, which may have the shape of the work piece shown in Figure 4, is mounted in a fixture, generally designated 12. The fixture 12 comprises a jaw 13 with a V-shaped recess 14 for engaging one end of the work piece 11, while the other end is engaged by a clamping member 15 which is supported by a bolt 16, partially surrounded by a spring 17 and threaded into a supporting member 18. A nut 19 clamps the member 15 against the right hand end of the work piece, and presses the latter against the supporting member 18.

The work piece shown in the drawings is I-beam shaped in section, as will appear from Figure 8, and constitutes a connecting member, which may, for instance, be used for internal combustion engines. Both sides of the work piece are of the same shape and are to be ground by two identical grinding units on each side of the table 10. Only one of the grinding units will be explained in detail, while corresponding parts of the other grinding unit will carry the same reference numerals, however, with the additional letter *a*.

The grinding unit substantially comprises a grinding wheel 20 mounted on a shaft 21 and driven by an electric motor 22 by means of pulleys 23 and 24 operatively interconnected by a belt 25. The shaft 21, together with the driving mechanism therefor, is supported by a supporting slide 26, which is movable toward and away from the work piece so as to allow spacing of the grinding wheels 20, 20a from each other for inserting or removing a work piece therebetween.

During the working operation, the work piece 11 is reciprocated in longitudinal direction thereof, while the grinding wheels 20, 20a rotate without moving longitudinally with regard to the work piece.

The grinding wheels 20, 20a are adapted to move transversely with regard to the adjacent lateral surface of the work piece, but are prevented from doing so during the greater part of the machining operation. However, when the work piece 11 has moved to such an extent that the grinding wheels 20, 20a are about to machine the curved end surfaces 27 and 28 of the work piece, the grinding wheels carry out such a movement that the outer periphery thereof moves along the surfaces 27 and 28. This movement of each grinding wheel is effected by a mechanism housed in the casing 29, 29a, actuated by a hydraulically operable cylinder-piston-assembly, generally designated 30, 30a.

Referring now to Figures 9 and 11 respectively showing a transverse and longitudinal section through the casing 29 housing the shaft 21 of the grinding device, it will be noted that the casing 29 has rotatably mounted therein a drum 32. The drum 32 has connected thereto, in any convenient manner for instance by screws 33, a dish-shaped member 34 which, in its turn, has connected thereto, in any convenient manner for instance by screws 35, a segmental gear 36. The member 34 and gear 36 are provided with oval bores 37 and 38 respectively.

The gear 36 is adapted to mesh with racks 39 and 40, forming part of two piston rods 41 and 42 respectively. The piston rod 41 interconnects two spaced pistons 43 and 44 respectively mounted in a cylinder 45. The cylinder 45 is closed at its ends by closure members 46 and 47 which have bores therethrough, connected with conduits 48 and 49 respectively.

To prevent rotation of the pistons 43 and 44, the piston rod 41 is provided with a longitudinal ridge 50, engaged by a guiding member 51. The cylinder 45 has furthermore connected thereto a conduit 52. Similarly, the piston rod 42 interconnects two pistons 53 and 54 reciprocable in a cylinder 55, the ends of which communicate with conduits 56 and 57 respectively, while a conduit 58 is connected with the cylinder 55 at a point between the ends of the cylinder.

The piston rod 42 also comprises a ridge 59 engaged by a guiding member 60 for preventing rotation of the pistons 53 and 54 in the cylinder 55. The cylinders 45 and 55 are connected in any convenient manner, for instance, by screws 61, to the casing 29.

As will be seen from Figure 11, the drum 32 is prevented from moving longitudinally in the casing 29 by means of the flange 62 connected to the drum 32 and the flange 63, forming a part of the member 34. To provide for proper lubrication between the drum 32 and the casing 29, an oil receiving annular recess 64 is provided.

The drum 32 has inserted therein and in any desired manner connected thereto, a supporting member 65, carrying the shafts 66, 67, 68 and 69 of a gear train respectively comprising the pinions 70, 71, 72 and 73. The shafts 66 and 69 are journalled in anti-friction bearings 74 and 75 respectively. The pinion 73 is also connected with a threaded extension 76 threadedly engaging a nut 77 which is rigidly connected, by means of screws 78, to a slidable block 79.

The block 79 has a slot 80 passing from one side of the block 79 to the bore 81 in the block 79, and is provided with one or more clamping screws 82 transversing the slot 80. The block 79 is slidable between a guiding member 83 and the surface 84 of the drum 32. A key 85, connected to the drum 32 by means of screws, engages a groove 86 in the block 79. The guiding member 83 may be adjusted by a screw 87 supported by the drum 32.

The drum 32 is composed of two parts 88 and 89, which are properly located with regard to each other by means of a key 90, and are connected with each other by screws 91. To properly lubricate the guiding surfaces for the block 79, an oil groove system, generally designated 92 is provided, which communicates with the annular recess 64, and also communicates with oil channels 93 for lubricating the shafts 67 and 68 pertaining to the pinions 71 and 72.

Mounted in the bore 81 of the slidable block 79 is the shaft 21. The shaft 21 carries, at one end thereof, the grinding wheel 20 and, on the other end, the pulley 24. The end adjacent the pulley 24 extends through a closure 95 connected to the cylinder assembly, generally designated 96, and carrying the cylinders 45 and 55. A bearing member 94 is clamped in the bore 81 of the slidable block 79 by means of the screw 82, so that the bearing member 94 forms a rigid unit with the slidable block.

As will be clear from Figures 9 and 11, rotation of the pinion 73 causes rotation of the screw or threaded extension 76 connected thereto and engaging the nut 77. Inasmuch as the latter is stationary in the slidable block 79, it will be obvious that rotation of the threaded extension 76 causes longitudinal movement of the slidable block 79, thereby moving the bearing member 94 relative to the center of the drum 32. This movement will cause a corresponding movement of the grinding wheel 20 so that the grinding wheel 20 will be fed toward the work piece surface to be machined.

The rotation of the pinions 70, 71, 72 and 73, which mesh with each other, is effected by a shaft 98, which is drivingly connected with the shaft 66 pertaining to the pinion 70. The shaft 98 is supported by a sleeve 99 which, in its turn, is carried by a casing 100, supported by and rotatable with the drum 32.

Connected to the shaft 98 is a worm wheel 101 meshing with a worm 102 keyed to a shaft 103. Also rotatably connected to the shaft 103 is a hand wheel 104 and a star wheel 105. The star wheel 105 is adapted to cooperate with an indexing member 106 supported by the housing 29. When the star wheel 105 engages the indexing member 106, while the drum 32 continues its rotation, the star wheel 105 will be rotated by a predetermined angle, in this instance, 60 degrees, as indicated in dot-dash lines in Figure 9, showing the star wheel at the time when it engages the indexing member 106, and at the time when it has moved or rolled over the indexing member 106. Due to this rotation of the star wheel 105, also the shaft 103 rotates by 60 degrees, so that the worm 102 imparts a corresponding rotation on the shaft 98 which, in its turn, rotates the pinions 70, 71, 72 and 73. As previously mentioned, rotation of the pinion 73 causes movement of the slidable block 79.

When the star wheel 105 has moved beyond the indexing member 106, it stays in its respective angular position relative to the shaft 103 until the star wheel, during the rotation of the drum 32 in the same direction, again engages the indexing member 106.

If it is desired for the purpose of setting the machine to manually effect a sliding movement of the slidable block 79, the operator rotates the hand wheel 104, which will result in a rotative movement of the shaft 98, and in a rotation of the pinion 73, in the manner previously described. To facilitate the control of the rotation of the shaft 98, a dial 107 is connected to the shaft 98.

The rotation of the drum 32 is effected by the cylinder assembly 96, as will presently appear.

*Rotative movement of the drum*

Referring to Figures 13, 14, 15 and 16, diagrammatically illustrating various positions of the cylinder assembly 96, it may be assumed that the cylinder assembly 96 occupies the position shown in Figure 13. In this position, the pistons 43, 44, 53 and 54 are hydromechanically locked, namely, by means of pressure fluid acting on the pistons 43 and 53 and the mechanical interconnection of the racks 39 and 40 by means of the segmental gear 36.

It may now be assumed that the center of the shaft and, thereby of the grinding wheel 20 is in a position eccentric with regard to the center of the drum 32. It is furthermore assumed that when, at the end of each cycle, the grinding wheel 20 is substantially in the position indicated in dot-dash lines in Figure 4, the eccentricity between the center of the grinding wheel 20 and the center of the drum 32 is to be increased so that the grinding wheel is fed further toward the surface 108, so as to take off more material therefrom. It is also assumed that the grinding wheel 20 has just been fed toward the surface 108 so as to occupy the position indicated in dot-dash lines in Figure 4, while the star wheel 105 has just moved over the indexing member 106 in anti-clockwise direction with regard to Figure 9, or in clockwise direction with regard to Figure 13. The star wheel 105 now occupies the position P indicated in dot-dash lines in Figure 9. In this position, the star wheel 105 has completed its angular movement and will not be actuated again until the drum 32 has performed a complete rotation.

When the star wheel 105 occupies the position P of Figure 9, the cylinder assembly 96 is assumed to occupy the position shown in Figure 13. In this position, the segmental gear 36 and the racks 39 and 40 are hydraulically locked by fluid admitted through conduits 49 and 56 into the left-hand portion of the cylinders 45 and 55 respectively.

As will be clear from Figure 13, the fluid in cylinder 45 tends to move the rack 39 toward the right to impart a clockwise movement on the segmental gear 36, while the fluid in cylinder 55 tends to move the rack 40 toward the right, endeavoring to impart an anti-clockwise movement on the gear 36. Since the forces acting on the piston 43 equal the forces acting on the piston 53, the segmental gear 36 is held stationary. Consequently, the grinding wheel 20 is now held in the position indicated in dot-dash lines in Figure 4, while the work piece 11, together with the fixture 12 and table 10, moves toward the left with regard to Figure 4. Since the grinding wheel 20 is rotating about its axis, it will be clear that the grinding wheel will grind the surface 108.

When the grinding wheel 20 has reached the position indicated in dot-dash lines in Figure 5 and is just about to machine the surface 28, a control mechanism, which will be described later, causes the fluid in the left-hand end of the cylinder 55 to exhaust through conduit 56, while fluid pressure is admitted through conduit 57 into the right-hand end of the cylinder 55. The forces now acting on the pistons 43 and 54 do not oppose each other, but act through the racks 39 and 40 on the gear 36 in such a manner that the gear 36 rotates in clockwise direction with regard to Figure 14, or in anti-clockwise direction with regard to Figure 9. This, in turn, brings about a corresponding 180 degree rotation of the drum 32 to which the gear 36 is connected.

As a result thereof, the grinding wheel 20 performs such a movement, in addition to its rotation about its axis, that its periphery will move along a line conforming to the contour of the surface 28, thereby machining the latter. In other words, the grinding wheel 20 moves from the position indicated in dot-dash lines in Figure 5 through the position indicated in Figure 6 into the position indicated in dot-dash lines in Figure 7. When the grinding wheel 20 substantially occupies the position indicated in dot-dash lines in Figure 7 so that the grinding wheel 20 is about to machine the surface 97, the segmental gear 36 and the racks 39 and 40 substantially occupy the position shown in Figure 16, in which they are hydraulically locked by pressure fluid admitted through conduits 57 and 48 into the respective right-hand ends of the cylinders 45 and 55.

It is to be noted that when the rack 40 has moved from Figure 14 position toward the left to such an extent that, as indicated in Figure 15, the rack 39 does not mesh with the teeth on the gear 36, the fluid in the left-hand end of the cylinder 45 is exhausted through the conduit 49, and fluid pressure is introduced through the conduit 48 into the right-hand end of the cylinder 45, so that the rack 39 moves toward the left without meshing with the teeth of the gear 36.

Since, as mentioned above, the gear 36 in Figure 16 is again hydraulically locked, no further movement of the grinding wheel 20 takes place, with the exception of its rotation about its axis. Inasmuch as the work piece 11 is now moving toward the right, as indicated by the arrow R in Figure 7, the grinding wheel 20 now machines the surface 97.

When the grinding wheel 20 has reached the left end of the straight surface 97 and is about to machine the curved surface 27, a control mechanism, which will be described later, causes exhaust of the fluid in the right-hand end of the cylinder 45, while fluid pressure is admitted to the left-hand end of the cylinder 45 through the conduit 49.

The forces acting on the pistons 43 and 53 now do not oppose each other, but cooperate with each other in bringing about a rotation of the gear 36 in clockwise direction with regard to Figure 16, or in anti-clockwise direction with regard to Figure 9. The gear 36 then rotates by 180 degrees so that, at the end of this rotation, the gear 36 again occupies the position shown in Figure 13, while the drum 32 occupies the position shown in Figure 9. During this rotation, the grinding wheel 20, due to its eccentricity with regard to the center of the drum, performs such a movement that the periphery of the grinding wheel moves along the surface 27, thereby machining the same.

Just before the grinding wheel 20 again engages the straight surface 108, i. e., just before the gear 36 completes its 180 degree rotation, the star wheel 105 rolls over the indexing member 106, thereby imparting a rotation on the shaft 103, which latter, by means of the worm 102 connected thereto, and meshing with the worm wheel 101 on the shaft 98, effects a corresponding movement of the pinions 70, 71, 72 and 73. Rotation of the pinion 73 results in a longitudinal movement of the slidable block 79, as mentioned under "General arrangement," thereby increasing the eccentricity of the grinding wheel 20 with regard to the drum 32. In other words, the grinding wheel is fed further into the material of the work piece to be machined.

When the star wheel 105 has rolled over the indexing member 106, no further longitudinal movement of the slidable block 79 is effected, while substantially simultaneously the rotation of the drum 32 is stopped. The segmental gear 36 then again occupies the position shown in Figure 13. In the meantime, i. e., when during the last mentioned rotation of the gear 36, the rack 40 has disengaged the teeth of the gear 36, fluid is exhausted from the right-hand end of the cylinder 55, while fluid pressure is admitted to the left-hand end of the cylinder 55 so as to bring the rack 40 from Figure 16 into Figure 13 position. When the gear 36 occupies the position shown in Figure 13, it is again locked, as previously explained. Inasmuch as the work piece 11 now moves toward the left, as indicated in Figure 5, the grinding wheel 20 will further machine the surface 108 and a new machining cycle is then started.

It will be appreciated that, at the point where the feeding takes place, a very slight step may occur. To eliminate this step, the operator, following the last mentioned cycle, moves the indexing member 106 in longitudinal direction in the bore 119 so that the indexing member 106 will not be engaged by the star wheel 105 when the drum 32 performs a complete rotation. In this way, there will be no further feeding of the grinding wheel, so that the machined surface will be completely smooth (sparked out) after a further complete rotation of the drum, following the last mentioned cycle.

The indexing member 106 has two spaced recesses corresponding to its operative and inoperative position, which recesses are engaged by a detent member 120.

When the machining operation of the work piece 11 has been completed, the slides 26 and 26a and, therefore, also the grinding wheels 20 and 20a are retracted from the work piece, as indicated in Figure 1, so that the work piece may be removed and replaced by an unmachined work piece. The slides 26 and 26a are then again moved so as to bring the grinding wheels 20 and 20a into their operative positions. The grinding wheels are brought into their final work piece engaging position by a corresponding movement of the hand wheels 104 and 104a. This movement has been explained under "General arrangement" and brings about a movement of the slidable block 79, thereby bringing the grinding wheels 20 and 20a into the desired eccentricity with regard to the drums 32 and 32a pertaining thereto.

*Operation of the cross slides*

Referring to Figures 17 and 18 showing the supporting or cross slide 26, it will be seen that the latter has a slant guiding surface 109 engaging a correspondingly shaped guiding surface on the support or foot 110 of the machine. The slide 26 has furthermore a straight guiding surface 111 engaging a corresponding guiding surface on the support 110.

Connected to the slide 26 is an extension 112, the lower end of which is provided with a bore 113, through which passes a reduced end 114 of a screw 115. Connected to the reduced end 114, for instance by means of a nut 116, is a hand wheel 117, which is also keyed to the reduced portion 114. The screw 115 threadedly engages two nuts 118 and 121 which are rigidly connected to an auxiliary slide 122 so that rotation of the screw 115 will move the slide 122 in one or the other direction depending on the direction of rotation of the screw 115.

The auxiliary slide 122 is slidable in a dovetailed portion 123 of the supporting or cross-slide 26. Connected to the auxiliary slide 122 is an extension 124, engaging a reduced portion 125 of a piston rod 126, which is connected to a fluid operable piston 127 reciprocably mounted in a cylinder 128. The cylinder 128 is connected to the support 110. The extension 124 is clamped, by means of a nut 129, against the shoulder 130 of the piston rod 126.

Fluid pressure may be admitted selectively to one or the other side of the piston 127 so as to move the piston rod 126, and thereby the extension 124 connected to the auxiliary slide 122, in one or the other direction.

Inasmuch as the auxiliary slide 122 is locked through the screw 115 and the extension 112, clamped between the threaded part of the screw 115 and the hand wheel 117, to the supporting or cross slide 26, a reciprocatory movement of the piston 127 and the extension 124 will not only result in a reciprocatory movement of the auxiliary slide 122, but also of the cross slide 26.

To vary the minimum distance of the grinding wheel from the work piece without changing the total stroke of the piston 127, the operator rotates the hand wheel 117 in one or the other direction, thereby rotating the screw 115. Inasmuch as, at this time, the fluid in the cylinder 128 holds the piston 127, and, thereby, the piston rod 126 and extension 124 connected to the auxiliary slide 122, stationary, rotation of the screw 115 causes the latter to move out of or into the nuts 118 and 121 depending on the direction of rotation of the hand wheel 117, so that the screw 115 performs a longitudinal movement. This longitudinal movement causes the cross slide 26, connected to the screw 115 by the extension 112, likewise to perform a longitudinal movement so as to move the grinding wheel 20 toward or away from the work piece.

Hydraulic circuit

Referring now to Figure 19 illustrating the hydraulic control circuit for the device according to the invention, this hydraulic circuit comprises a main pump 129 connected by a conduit 130 with a fluid reservoir or tank 131. The tank 131 communicates through conduit 132 with a conduit 133. The conduit 133 has one end connected to a solenoid controlled four-way valve 134 which, in its turn, communicates through the conduit 48a with one end of the cylinder 45a, and through the conduit 49a, containing a check valve 135, with the other end of the cylinder 45a.

A further conduit 136 leads from the solenoid controlled valve 134 to a conduit 137. The conduit 137 has one end connected to a solenoid controlled four-way valve 138, which communicates through conduit 139 with the conduit 130, and through conduit 56a, comprising a check valve 140, with one end of the cylinder 55a, while the other end of the cylinder 55a communicates through conduit 57a with the valve 138. The check valves 135 and 140 are adapted to be by-passed by conduits 141 and 142, respectively comprising a choke 143 and 144.

The valves 135 and 143 and the conduit 141 constitute a choke-check arrangement, which allows unrestricted flow from the cylinder 45a and the conduit 49a to the valve 135, while permitting only a restricted flow of fluid from the valve 134 through the choke valve 143 and the conduit 49a into the left hand end of the cylinder 45a.

Also communicating with the tank 131 is a conduit 145 leading to a manually operable four-way valve 146 which controls the flow of fluid to and from the cylinder 128a which, in its turn, controls the movement of the cross slide 26a.

The conduit 145 comprises a spring loaded check valve 180, which is adapted to choke the fluid expelled from the cylinder 128a to the tank 131 so that the cross slide cannot be retracted with a sudden push, which would damage the machine.

The cylinder 128a is connected with the four-way valve 146 through the conduits 147 and 148. The four-way valve 146 furthermore communicates through a conduit 149 with a conduit 150 comprising a throttle 151, and having one end connected through conduit 152 with the pressure side of the pump 129.

Branching off from the conduit 150 is a conduit 153 leading to the conduit 137. The conduit 153 furthermore leads to a manually operable four-way valve 154 for controlling the supply of fluid to and from the cylinder 128 which, in its turn, controls the movement of the cross slide 26. The four-way valve 154 is connected with the cylinder 128 by conduits 155 and 156. Furthermore, a conduit 157 connects the four-way valve 154 with the tank 131. The conduit 157 comprises a spring loaded check valve 181, similar to and for the same purpose as the spring loaded check valve 180.

The pressure line 152 leads to a solenoid controlled master valve 158 which is connected, by means of a conduit 159, with a retarding valve 160, which latter communicates through a conduit 161 with another retarding valve 162. The retarding valves 160 and 162 are choke valves which are normally open, but are adapted to be moved into choking position by means of the lever arms 160' and 162', which are respectively actuated by the ends of the table 10. In this way, the exhaust from the table operating cylinder 168 is throttled whenever the plunger 169, reciprocable in the cylinder 168, reaches one or the other end of its stroke.

The retarding valve 162 is connected through the conduit 163 with a solenoid operated valve 164, which is normally held closed, but is adapted to be opened electrically for connecting the conduit 163 with the conduit 165 leading to the tank 131.

The master valve 158 is furthermore connected through conduits 166 and 167 respectively with the ends of a cylinder 168, having reciprocably mounted therein a plunger 169 for reciprocating the table 10 supporting the work piece 11.

Similar to the cylinder 45a, the cylinder 45 is connected through conduits 48 and 49 with a solenoid operated valve 170. The conduit 49 comprises a check valve 171 adapted to be by-passed by a conduit 172 with a choke 173. The four-way valve 170 also communicates through a conduit 174 with the conduit 137.

The supply of fluid to and from the cylinder 55 is controlled by a solenoid operated four-way valve 175, which communicates through the conduit 176 with the conduit 133. The conduit 57 comprises a check valve 177 adapted to be by-passed by a conduit 178 with a choke 179.

The operation of the hydraulic system shown in Figure 19 is as follows:

It may be assumed that the plunger 169, connected to the table 10 and reciprocable in the table control cylinder 168, is in its right hand position, and that the table is loaded with a work piece. It may further be assumed that the piston rods 126 and 126a, pertaining to the cylinders 128 and 128a for controlling the movement of the supporting or cross slides 26 and 26a, are in their retracted position which, considering Figure 19, is the right hand position with regard to the piston rod 126, and the left hand position with regard to the piston rod 126a.

To bring the grinding wheels into work piece engaging position, the operator shifts the valves 146 and 154 so that fluid pressure from the pump 129 passes through the conduit 150 and the valves 146 and 154 into the left hand end of cylinder 128a, and right hand end of cylinder 128. As a result thereof, the piston rods 126 and 126a move toward each other and, thereby, toward the work piece, while fluid is expelled from the cylinder 128 through valve 154 and conduit 157 into the tank 131, and from cylinder 128a through valve 146 into the tank 131.

The inward movement of the piston rods 126 and 126a is controlled by the setting of the spring loaded check valves 181 and 180. When the cross slides 26 and 26a have been moved inwardly by the piston rods 126 and 126a, the operator, by actuating the hand wheels 104 and 104a, brings the grinding wheels 20 and 20a into proper engagement with the work piece 11, as described under "General arrangement."

Now all parts are ready for beginning the actual machining operation. The operator, therefore, closes an electric circuit, which will be described later, so as to shift the master valve 158 into position for admitting pressure fluid from the pump 129 through conduit 152, master valve 158 and conduit 167 into the right hand end of the table controlling cylinder 168. Furthermore, the valve 164 is electrically opened, thereby establishing fluid connection between the left hand end of the table controlling cylinder 168 through conduit 166, master valve 158, conduit 152 with the pressure side of the pump 129. Furthermore, the valve 164 is electrically opened so as to establish fluid connection between the left hand end of the cylinder 168 and the tank 131 through the conduit 166, master valve 158, conduit 159, retarding valve 160, conduit 161, retarding valve 162, conduit 163, valve 164 and the conduit 165.

Therefore, the piston rod 126 and the table 10, connected thereto and supporting the work piece, move toward the left so that the grinding wheels occupy the position indicated in dot-dash lines in Figure 4, in which they begin to machine the surface 108 and 108a.

When the work piece on the table 10 has moved toward the left to such an extent that the grinding wheels approach the position indicated in dot-dash lines in Figure 5, but have not yet reached the said position, the cam 182 (Figure 2) actuates the lever 162' so as to move the retarding valve 162 into choking or throttling position, thereby restricting the flow of fluid from the left hand portion of the cylinder 168 into the tank 131. This slows down the movement of the table 10. When the table 10 has moved toward the left to such an extent that the grinding wheels are in the position indicated in dot-dash lines in Figure 5, i. e., are at about the right hand end of the straight surfaces 108 and 108a, the dog 183 (Figure 2) actuates a limit switch E, which controls the circuit of the solenoid pertaining to the valve 164, so as to deenergize the said solenoid. As a result thereof, the valve 164 closes, and no more fluid can be expelled from the left side of the table controlling cylinder 168. Consequently, the table 10 comes to a halt.

Now an electric control circuit, which will be described later, causes the solenoids pertaining to the valves 134, 138 and 170, 175 to respectively shift these valves so that fluid pressure is admitted to the cylinder assemblies 96 and 96a in a manner previously described in connection with "General arrangement" so that the drum 32 causes the grinding wheel 20 to move along the curved surface 28, while simultaneously the drum 32a causes the grinding wheel 20a to perform a corresponding movement.

When the grinding wheels have reached the position indicated in dot-dash lines in Figure 7, the master valve 158 is electrically reversed so that pressure fluid from the pump 129 now flows through conduit 152, master valve 158 and conduit 166 into the left hand end of the table controlling cylinder 168, while the conduit 167 is connected with the conduit 159. Furthermore, the solenoid controlling the valve 164 is again energized so as to establish fluid connection between the conduits 163 and 165 leading to the tank 131. Therefore, the pressure fluid acting at the left hand end of the cylinder 168 causes the plunger 169 and the table 10, connected thereto, to move toward the right. The grinding wheels then machine the surfaces 97 and 97a (see Figures 7 and 8).

Shortly after the rightward movement of the table has begun, the cam 182 again releases the lever 162' so that the retarding valve 162 again opens. Both retarding valves 160 and 162 are now open so that the fluid expelled from the right hand end of the table cylinder 168 is not throttled. Therefore, the machining can take place at a high advancing speed of the work piece.

When the work piece 11 has moved toward the right to such an extent that the grinding wheel 20 approaches the position in which it will machine the surface 27, the cam 184 (see Figure 2) actuates the arm 160' so as to move the retarding valve 160 into throttling position. This throttles the exhaust from the right hand end of the cylinder 168, thereby slowing down the rightward movement of the table 10 and the work piece 11, supported thereby.

When the grinding wheel 20 has reached the position at which it is about to machine the surface 27 (grinding wheel 20a has reached a corresponding position), the dog 185 engages the limit switch D, thereby causing deenergization of the solenoid controlling the valve 164. The valve 164 therefore closes, and prevents any further exhaust of fluid from the right hand end of the cylinder 168. As a result thereof, the table 10 comes to a halt.

The valves 134, 138, 170 and 175 are again electrically controlled so that the cylinder assemblies 96, 96a cause the grinding wheel 20 to move along the curved surface 27, while the grinding wheel 20a performs a corresponding movement. When the grinding wheels have reached a position corresponding to the position indicated in dot-dash lines in Figure 4, the master valve 158 is again reversed and the valve 164 is again opened, so that another machining cycle may be performed, as previously described.

When the desired number of machining cycles has been performed so that the machining of the work piece is completed, the operator shifts the casing 187, which is shown in Figure 2 and will be described later, out of the path of the dogs 185 and 183. Furthermore, fluid pressure is admitted to the cylinders controlling the movement of the cross slides 26 and 26a so as to cause said slides and, thereby, the grinding wheels 20 and 20a to move away from each other and from the work piece. Fluid pressure is then admitted to one end of the table cylinder 168 so that the plunger 169 performs a complete stroke, thereby fully withdrawing the table and the work piece. The work piece is then unloaded and replaced by a new one, whereupon fluid pressure admitted to the opposite side of the table cylinder will move the table and the new work piece again into initial position. The grinding wheels are then again brought into engagement with the work piece, as previously described, and a new machining cycle will be started.

Electric circuit

Referring to Figure 20, the cam shows in diagrammatic form the grinding wheels 20, 20a respectively supported by the supporting slides 26, 26a having cams 188 and 189. The cam 188 is adapted selectively to engage a pin or contact 190 or 191, thereby closing the normally open switch 192 or the normally open switch F.

One terminal of the switch 192 is connected, by means of a line 194, with one terminal of the switch 204, while the other terminal of the switch 192 is connected, by means of the line 196, with the line 197 which, in its turn, is adapted, by closure of the switch C to be electrically connected with the main supply line 195. The switch F, when closed, connects the line 199 with the line 200. One end of the line 199 is connected to one terminal of the normally open switch G, which is adapted to be closed by the cam 189 when the latter engages the pin or contact 202. The other terminal of the switch G is connected, by line 203, with the line 200. The normally open switch 204 is adapted to be closed by the cam 189 when the latter engages the contact or pin 205. In closed condition, the switch 204 establishes connection between the line 194 and the line 206 leading to the terminal 207.

The terminal 207 is adapted selectively to be engaged by the switch blade A so as to connect the line 206 with the line 209, which latter comprises a solenoid $DS_1$, pertaining to the master valve 158. The line 209 is connected with the main supply line 210. Also connected with the main supply line 210 is a line 211, comprising a solenoid $ES_1$, pertaining to the master valve 158.

The solenoid $DS_1$, when energized, shifts the master valve 158 in one direction, whereas the solenoid $ES_1$, when energized, shifts the master valve 158 in the opposite direction.

Furthermore connected with the main supply line 210 is a line 212, comprising a solenoid $ES_4DS_4$, pertaining to the valve 164. The line 212 is adapted to be connected by closure of the solenoid blade N with the line 213. The blade N is controlled by a solenoid 214, which is located in the line 199. The line 213 is adapted to be connected by closure of the relay blade $ER_4$ with the line 215, which latter is adapted to be connected with the line 216 by means of the relay blade $DR_4$. The line 216 is connected to the line 217, which has one end connected to the main supply line 195 and is adapted to be connected with the line 218 by closure of the relay blade $DR_1$. The line 218 is adapted to electrically communicate with the line 209 by means of the switch blade A.

A relay blade $DR_2DR_3$ is adapted to establish electric connection between the line 219 and the line 220, which latter is connected to the main supply line 195, and is furthermore adapted to be connected with the line 221 by closure of the pressure switch K. The pressure switch K is hydraulically connected through a conduit 222 (Figure 13) with the cylinder 45, and is adapted to be closed in response to a predetermined pressure in the conduit 222. As will be clear from Figure 13, the pressure fluid acting on the left side of the piston 43 will be conveyed into the conduit 222 as soon as the piston 43, in its rightward movement, has moved beyond the port 223.

The line 221 comprises a solenoid KS and is connected to the line 224 comprising a solenoid MS. The line 224 is adapted to be connected with the line 225 by closure of the pressure switch M. The pressure switch M is actuated in response to a predetermined pressure in the conduit 226 (see Figure 13), which communicates with the cylinder 55. Pressure fluid acting on the right hand end of the piston 54 will be conveyed into the conduit 226 when the piston 54, in its leftward movement, moves beyond the port 227.

The line 221 also comprises a solenoid JS and is adapted to be connected with the line 228 by closure of the pressure switch J. The pressure switch J corresponds in its operation to that of the pressure switch K and pertains to the cylinder assembly 96a, whereas the switches K and M pertain to the cylinder assembly 96.

Connected with the line 228 is a line 229 adapted to be connected with the line 230 by closure of the pressure switch L. The pressure switch L, pertaining to the cylinder assembly 96a, corresponds in its function to the pressure switch M. The line 230 comprises a solenoid LS and is connected to the line 221. The line 197, connected to the main supply line 195, is adapted to be connected with the line 231 by closure of the switch D.

The switch C is shown in Figure 23, and is supported by the table 10. The switch C is closed when the casing 187, hinged by means of the pivot 232 to a lug 233 on the table 10, is moved from Figure 23 into Figure 24 position. To manually effect this shifting movement, the casing 187 is provided with a handle 234.

The switch D is closed when the table 10 has moved toward the left (Figure 2) to such an extent that the dog 183 engages the switch D. The line 231 comprises a solenoid DR and leads to a normally closed valve H which, when closed, connects the line 231 with the line 233, electrically connected to the main supply line 210. The valve H is adapted to be opened by a pin 235 connected with the rotating drum 32 when the pin 235, during its rotation, reaches a predetermined position. The pin 235, when rotating by 180 degrees from the position shown in Figure 20, opens the normally closed valve I, thereby breaking electric connection between the line 212 and the line 236.

The line 236 comprises a solenoid ER and is adapted to be connected with a line 237 by closure of a switch E, which is normally open. The switch E is closed by the dog 183 when the table 10, on its leftward movement with regard to Figure 2, has reached a predetermined position.

The line 237 is connected with the main supply line 195, and is also connected with a line 238, adapted to be connected with the line 239 by means of the relay blade $ER_2ER_3$. Connected with the line 238 is a line 240 adapted to be connected with a line 241 by closure of the relay blade $ER_1$. The blades $ER_1$, $ER_2ER_3$ and $ER_4$ are controlled by the solenoid ER. Similarly, the blades $DR_1$, $DR_2DR_3$ and $DR_4$ are controlled by the solenoid DR. The line 241 is normally connected by the switch B with the line 211. The line 239 is connected with one end of the solenoid $ES_3$, the other end of which is connected with the line 200. Interconnecting the lines 200 and 239 is a line 242 comprising a solenoid $ES_2$.

Connected with the line 209 is a line 243, comprising a solenoid $DS_2$, which, in its turn, is connected to the line 219, comprising a solenoid $DS_3$.

To facilitate the understanding of the operation of the electric circuit just described, reference may be had to Figures 21 and 22, of which Figure 21 shows the most essential elements of Figure 20 in simplified form in such a manner that the switches controlled by the various solenoids are arranged in a vertical row. For instance, from Figure 21 it will be visible that the switches DR4, DR1 and DR2DR3, arranged in a single vertical row, are controlled by the solenoid DR. Similarly, the solenoid ER controls the switches ER1, ER2ER3 and ER4.

Figure 22 indicates, for instance, that when the solenoid ES4DS4 is energized, the table moves either to the left or to the right. Figure 22 also indicates that, during the first movement of the drum 32 by an angle of 180 degrees, the solenoids ES1, ES2 and ES3 are energized, whereas, during the second movement of the drum 32 by 180 degrees, the solenoids DS1, DS2 and DS3 are energized.

It may now be assumed that the work piece 11 has been properly located on the table 10, and that the table 10 is in its outermost right hand position. At this time, the electrically controlled four-way valve 164 is open, since the solenoid ES4DS4 is energized. The energizing circuit for the solenoid ES4DS4 comprises main supply line 210, line 212, solenoid ES4DS4, switch M, line 213, relay blade ER4, line 215, relay blade DR4, lines 216 and 217, and main supply line 195.

It may further be assumed that the casing 187 is in the position of Figure 24, at which the switch C is closed. It may also be assumed that the cross slides 26 and 26a are in their outermost position, at which the cams 188 and 189 close the normally open switches 192 and 204 respectively.

In order to move the table 10 into operative position, the operator presses the switch A so as to establish electric connection between the lines 207 and 209. Electric current will then flow from the main supply line 195 through line 197, switch C, which is now closed since the casing 187 is in Figure 24 position, line 196, now closed switch 192, line 194, switch 204, line 206, terminal 207 now engaged by the switch A, line 209, solenoid DS1, and the main supply line 210. In this way, the solenoid DS1 will be energized, thereby shifting the master valve 158 (Figure 19) into position for establishing fluid connection between the conduit 152 and the conduit 167.

Since, as mentioned above, the valve 164 is open so as to establish fluid connection between the conduits 163 and 165 leading to the tank 131, pressure fluid from the pump 129 now flows through conduit 167 to the right hand end of the cylinder 168, thereby moving the plunger 169 and the table 10, connected thereto, toward the left, while the fluid expelled from the left hand end of the cylinder 168 passes through the conduit 166 and the master valve 158, the conduit 159, retarding valve 160, conduit 161, retarding valve 162, conduit 163, valve 164 and conduit 165 to the tank 131.

When the table 10 and, therefore, also the work piece 11, supported thereby, approaches the predetermined position at which the machining operation is to be started, the operator gradually closes the choke 244 in the conduit 152 of the hydraulic system shown in Figure 19, thereby interrupting the supply of pressure fluid to the right hand end of the table cylinder 168 and bringing the table 10 to a stop. Immediately after the table started its movement from its outermost position to the last mentioned position, the operator may release the switch A so that it returns to its initial position. Although this will break the energizing circuit for the solenoid DS1, pertaining to the master valve 158, it will not affect the position of the master valve 158, which stays in the position into which it was last moved.

The operator now manually controls the four-way valves 245, 245a (Figure 3) by actuating the levers 246, 246a so as to supply pressure fluid to the cylinders 128 and 128a. As a result thereof, the piston rods 126 and 126a, pertaining to the pistons in the cylinders 128 and 128a, move the cross slides 26, 26a toward the work piece, thereby also moving the grinding wheels 20 and 20a toward the work piece. When the pistons in the cylinders 128 and 128a have reached the end of their stroke, the cross slides 26, 26a, with the grinding wheels 20, 20a, stop.

The operator then actuates the hand wheels 117, 117a to bring the grinding wheels 20, 20a into proper engagement with the work piece, in the manner previously described under "Operation of the cross slides." The operator now actuates the hand wheels 104, 104a to establish the desired eccentricity between the axes of rotation of the grinding wheels 20, 20a and the axes of rotation of the respective drum. It may now be assumed that, after this adjustment, the grinding wheels are in the position shown in dot-dash lines in Figure 4.

It will be noted that, when the cross slides move from their outermost position toward the work piece, they release the pins or contacts 190 and 205 so that the switches 192 and 204 open. This, however, has no effect on the energizing circuit for the solenoid DS1, which circuit as mentioned above, was already broken by the return of the switch A to its initial position. When the cross slides 26, 26a have been moved to their inward position, the cams 188 and 189 respectively engage the pins 191, 202, thereby closing the switches F and G. This will establish an electric circuit comprising the main supply line 195, switch C, line 196, solenoid 214, line 199, switches F and G, line 200 and main supply line 210.

Due to the energization of the solenoid 214, the switch N opens, thereby interrupting the energization of the solenoid ES4DS4 so that the valve 164 closes. No fluid from the table cylinder 168 can therefore escape to exhaust, so that, since fluid pressure prevails in the conduit 167, the table is positively held stationary. All parts are now in position for starting the actual machining operation.

To initiate this operation, the operator shifts the casing 187 from Figure 24 into Figure 23 position, thereby opening the switch C so that the energizing circuit for the solenoid 214 is broken and the switch N again closes. This again establishes the energizing circuit for the solenoid ES4DS4 so that the valve 164 again opens. Now the operator opens the choke 244 to a desired extent, in accordance with the desired speed of the table 10. Since, as previously mentioned, the valve 164 is open, due to the energization of the solenoid ES4DS4, while the master valve 158 establishes fluid connection between the pressure line 152 and the conduit 167, the table 10, and thereby also the work piece 11, now moves toward the left with regard to Figures 4 and 19. In this way, the grinding wheels 20 and 20a will machine the straight surfaces 108, 108a (Figures 4 and 8).

Shortly before the grinding wheels, during this operation, reach the position indicated in dot-dash lines in Figure 5, the cam 182 actuates the lever arm 162', pertaining to the retarding valve 162, so as to throttle the flow of fluid through the valve 162. This causes a gradual reduction in the speed of the table so that the latter comes to a gradual stop at the end of its leftward movement, at which the grinding wheels substantially occupy the position shown in Figure 5.

When the grinding wheels are substantially in the position indicated in dot-dash lines in Figure 5, so that they are about to begin machining of the adjacent curved surfaces (only one surface 28 being shown), the dog 183 closes the switch E, thereby closing the energizing circuit for the solenoid ER. This circuit comprises main supply line 195, line 237, switch E, line 236, solenoid ER, the normally closed switch I, which is closed at this time, line 212 and main supply line 210.

Energization of the solenoid ER causes closure of the relay blades ER₂ER₃ and ER₁, while opening the relay blade ER₄. The opening of the relay blade ER₄ breaks the energization for the solenoid ES₄DS₄ so that the valve 164 closes. The table 10 is, therefore, positively stopped. Closure of the relay blade ER₁ establishes a circuit, which circuit comprises main supply line 195, lines 237, 238 and 240, blade ER₁, line 241, switch B, line 211, solenoid ES₁ and main supply line 210. This causes energization of the solenoid ES₁, thereby reversing the position of the master valve 158 so as to establish fluid connection between the pressure line 152 and conduit 166, while connecting the line 167 with the line 159. However, since the valve 164 controlling the exhaust through conduits 159, 161 and 163 is closed, no movement of the table 10 is possible at this time.

Closure of the relay blade ER₂ER₃ closes the energizing circuit for the solenoids ES₂ and ES₃, which circuit comprises the main supply line 195, lines 237 and 238, relay blade ER₂ER₃, line 239, solenoids ES₂ and ES₃, line 242 and main supply line 210. Energization of the solenoids ES₂ and ES₃ controls the position of the four-way valves 138 and 175 so as to cause rotation of the segmental gears connected to the rotatable drums (only one gear 36 and one drum 32 being shown) from Figure 13 into Figure 16 position, in which latter position they are locked, in the manner previously described under "Rotative movement of the drum."

While the gears and thereby the drums are moving from Figure 13 into Figure 16 position, the grinding wheels, due to their eccentricity with regard to the axes of rotation of the drums, perform such a movement that the periphery of the grinding wheels machines the adjacent curved surface, as indicated in Figure 6. When, during this movement, the piston 54 is on its way to the left side of the cylinder 55 and passes beyond the port 227, the pressure fluid acting on the piston 54 is conveyed through the conduit 226 to the pressure switch K so as to close the same. A similar operation in the cylinder 55a causes closure of the pressure switch J.

Closure of the switches J and K causes energization of the solenoids JS and KS, pertaining to the valves 134 and 170 respectively. As a result thereof, the valves 134 and 170 are reversed, thereby bringing about movement of the rack 39 in the cylinder 45 from its extreme right hand position, with regard to Figure 14, into the position shown in Figure 16 through the position of Figure 15. A corresponding movement is effected with the rack in the cylinder 45a. As will be obvious, during this movement, which occurs while the rotatable drums are being rotated by 180 degrees, the pressure switches J and K again open, thereby breaking the energizing circuit for the solenoids JS and KS. This, however, does not change the position of the valves 134 and 170.

When the gears have reached Figure 16 position, the grinding wheels are in the position indicated in dot-dash lines indicated in Figure 7, in which they are about to begin machining of the straight surfaces 97, 97a. In this position the drums (only one drum 32 being shown) occupy such a position that the pin 235 has moved from Figure 20 position by 180 degrees so as to open the switch I, thereby breaking the energizing circuit for the solenoid ER. As a result thereof, the relay blades ER₁ and ER₂ER₃ return to their open positions, while relay blade ER₄ returns to its closing position. The opening of the relay blade ER₂ER₃ causes deenergization of the solenoids ES₂, ES₃ without, however, effecting a change in the position of the valves 138 and 175. Opening of the relay blade ER₁ breaks the energizing circuit for the solenoid ES₁. This has no effect on the position of the master valve 158.

Closure of the relay blade ER₄ causes energization of the solenoid ES₄DS₄. The energizing circuit for the solenoid ES₄DS₄ comprises main supply line 195, lines 217 and 216, relay blade DR₄, line 215, relay blade ER₄, line 213, switch N, line 212, solenoid ES₄DS₄ and main supply line 210. Consequently, the valve 164 opens and, inasmuch as, due to the last effected shifting movement of the valve 158 by solenoid ES₁, pressure fluid from the pump 129 now flows through conduit 166 to the left hand end of the table cylinder 168, the table 10, together with the work piece 11 supported thereby, begins its rightward movement. The grinding wheels 20, 20a therefore machine the straight surfaces 97, 97a, as indicated in Figure 7.

It is obvious that as soon as the table 10 has moved by a predetermined distance toward the right, it releases the switch E so that the latter again opens. When the grinding wheels approach the left hand end of the straight surfaces 97, 97a, the cam 184 actuates the lever arm 160', pertaining to the retarding valve 160, so as to throttle the flow of fluid therethrough. This causes a gradual reduction in the speed of the table so that the latter comes to a gradual stop at the end of its rightward movement, at which the grinding wheels are just in position to engage the curved left hand surfaces of the work piece 11. In this position, the dog 185 closes the switch D, thereby closing the energizing circuit for the solenoid DR. This energizing circuit comprises main supply line 195, line 197, switch D, line 231, solenoid DR, now closed switch H, line 233 and main supply line 210. Energization of the solenoid DR causes closure of the relay blades DR₁ and DR₂DR₃, while causing the relay blade DR₄ to open. Opening of the relay blade DR₄ breaks the energizing circuit for the solenoid ES₄DS₄ so that the valve 164 closes, and prevents any exhaust from the table cylinder 168 so that the latter is positively locked.

Closure of the relay blade DR₁ closes the energizing circuit for the solenoid DS₁, which circuit comprises main supply, line 195, line 217, relay blade DR₁, line 218, switch A, line 209, solenoid DS₁ and main supply line 210. Energization of the solenoid DS₁ causes reversal of the master valve 158 so as to effect hydraulic connection between the pressure line 152 and the conduit 167, while simultaneously effecting fluid connection between the conduit 166 and the exhaust line 159. However, since at this time, as mentioned above, the solenoid ES₄DS₄ is deenergized, so that the valve 164 in the exhaust line 152 is closed, no leftward movement of the table 10 can be effected.

Closure of the relay blade DR₂DR₃ establishes a circuit comprising main supply line 195, line 220, blade DR₂DR₃, line 219, solenoids DS₂ and DS₃, line 243 and main supply line 210. Energization of the solenoids DS₂ and DS₃ causes reversal of the valves 134 and 170 respectively so that fluid pressure conveyed to the cylinder assemblies 86, 86a again causes the gears (only one gear 36 being shown) and the drums pertaining thereto, to effect a rotation by 180 degrees from Figure 16 to Figure 13 position. Due to the eccentricity between the axes of rotation of the grinding wheels and the axes of rotation of the drums, the periphery of the grinding wheels performs such a movement as to machine the curved left hand surface of the work piece 11. When, during this movement, the piston 43 on its way to the right hand side of the cylinder 45 passes beyond the port 223, the pressure fluid acting on the piston 43 is conveyed through the conduit 222 to the pressure switch L so as to close the same. A similar operation in the cylinder 45a causes closure of the pressure switch M.

Closure of the switches L and M causes energization of the solenoids LS and MS, pertaining to the valves 138 and 175 respectively. As a result thereof, the valves 138 and 175 are reversed, thereby bringing about a movement of the rack 40 in the cylinder 55 from its extreme left hand position, with regard to Figure 16, into the position shown in Figure 13. A corresponding movement is effected with the racks in the cylinders 55a. As will be obvious during this movement, which occurs while the rotatable drums are being rotated by 180 degrees, the pressure switches L and M again open, thereby breaking the energizing circuit for the solenoids LS and MS. This, however, does not change the position of the valves 138 and 175.

At the end of the last mentioned machining step, the grinding wheels are again in the position indicated in dot-dash lines in Figure 4.

As will be obvious from the above description of the electric circuit, the drums have now performed a complete rotation, i. e. by 360 degrees. Consequently, as set forth in detail under "Rotative movement of the drum," the star wheels (only one star wheel 105 being shown), have actuated the slidable blocks pertaining to the drums and carrying the shafts of the grinding wheels, so that the eccentricity between the axes of rotation of the grinding wheels and their corresponding drums has been increased, with the result that the grinding wheels are further fed toward the straight surfaces 108, 108a.

When this feeding movement has been completed, the grinding wheels are again in position to begin machining of the straight surfaces 108, 108a. At this position the pin 235 has again opened the switch H. As a result of the opening of the switch H, the solenoid DR is deenergized so that the relay blade DR₄ returns to its closed position, while the relay blades DR₁ and DR₂DR₃ return to their open positions. Opening of the relay blade DR₁ causes deenergization of the solenoid DS₁ which, however, does not cause any change in the position of the master valve 158.

Opening of the relay blade DR₂DR₃ causes deenergization of the solenoids DS₂ and DS₃. This does not change the position of the valves 134 and 170.

Closure of the relay blade DR₄ closes the energizing circuit for the solenoid ES₄DS₄, which circuit comprises the main supply line 195, line 216, relay blade DR₄, line 215, relay blade ER₄, line 213, switch N, line 212, solenoid ES₄DS₄ and main supply line 210. Consequently, the valve 164 again opens so that fluid from the left hand end of the cylinder 168 can escape to the tank 131.

Since, on the other hand, pressure fluid from the pump 129 is conveyed through the master valve 158 to the right hand end of the table cylinder 168, the table 10 again moves toward the left, and a machining cycle starts in the manner previously described. It is obvious that as soon as the table 10 has moved by a predetermined distance toward the left, it releases the switch D so that the latter again opens.

When the machining operation has been completed, the operator may move the indexing member 106 into inoperative position, as described in connection with "Rotative movement of the drum," and may run the grinding wheels through an idle cycle, so that any step in the machined surface will be sparked out, as has likewise been explained under "Rotative movement of the drum."

When the machining operation has been fully completed, the table carrying the work piece is fully moved outwardly to its unloading position. To this end, the operator shifts the casing 187 from Figure 19 position into Figure 24 position, so that the dogs 183 and 185 will not actuate the switches E and D. After the casing 187 has thus been moved and the table 10 is being moved toward the left, the operator first actuates the throttle 244 so as to stop the table. Thereupon, the operator actuates the valves 146 and 154 so as to withdraw the grinding wheels 20, 20a from the work piece to such an extent that the cams 188 and 189 actuate the pins or contacts 190 and 205 respectively, thereby closing the switches 192 and 204. The operator then presses the switch B so as to establish electric connection between the lines 197 and 211. This establishes the energizing circuit for the solenoid ES₁, which circuit comprises main supply line 195, switch C, which is closed by movement of the casing 187 from Figure 23 to Figure 24 position, line 197, switch B, line 211, solenoid ES₁ and main supply line 210. As a result thereof, the master valve 158 is reversed so that fluid connection is now established between the pressure line 152 and the conduit 166, while the conduits 167 and 159 are connected with each other. When the operator now opens the throttle 244, pressure fluid from the pump 129 will move the table and, thereby, the work piece toward the right.

Since, due to the fact that the casing 187 has been shifted into Figure 24 position, the dog 185 cannot actuate the switch D, the table 10 will move to its extreme right hand position, where it will come to a stop. The table is then in unloading position so that the workpiece may be unloaded and replaced by a new one.

It will be obvious that a withdrawal of the grinding wheels and, therefore, of the cross slides from the work piece is necessary to allow an unimpeded retraction of the work piece and table into unloading position. A slight retraction of the cross slides 26, 26a merely to fully disengage the grinding wheels from the work piece is, however, not sufficient for a proper operation of the circuit. It will be appreciated that if, by mistake, the slides 26 and 26a are not withdrawn from the work piece, a retraction of the table to its unloading position is not possible. The reason for this fact is that when the casing 187 is shifted into Figure 24 position, so that the switch C is closed, the solenoid 214 is energized by a circuit comprising main supply line 195, switch C, line 196, solenoid 214, switches F and G, and main supply line 210. Therefore, the switch N opens and the solenoid ES₄DS₄ is deenergized, so that the valve 164 is closed.

As has been mentioned above, closure of the valve 164 prevents any exhaust from the table cylinder 168, thereby blocking any movement of the table 10. However, when the slides 26 and 26a are withdrawn from the work piece, the cams 188 and 189 disengage the pins or contacts 191 and 202 so that the switches F and G open, thereby preventing energization of the solenoid 214, which, in its turn, maintains solenoids ES₄DS₄ energized so that the valve 164 remains open.

If the table is on its rightward movement and, while so moving, is to be retracted to its unloading position, the operator merely shifts the casing 187 into Figure 24 position and withdraws the slides 26 and 26a, in the manner described above. The rightward movement of the table 10 will continue until the table has reached its outermost or unloading position.

Summary of operation

The operation of the device according to the invention may briefly be summarized as follows, without reference to the electric and hydraulic control means:

It may be assumed that the work piece 11 is properly connected to the reciprocable table 10, as indicated in Figure 4, and that the grinding wheels have been brought into engagement with the side surfaces of the work piece, as shown in Figure 2 and now occupy the position indicated in dot-dash lines in Figure 4.

The operator now starts the control mechanism, which causes leftward movement of the work piece 11, with regard to Figure 4, so that the grinding wheels, which are rotated by the electric motor 22, 22a, machine the surfaces 108 and 108a (see Figure 8). It will be understood that the grinding wheels, at this time, do not perform any movement in longitudinal and/or transverse direction of the work piece.

When the grinding wheels, due to the leftward movement of the work piece, have reached the position indicated in dot-dash lines in Figure 5, at which they are about to machine the curved right hand surfaces of the work piece (only one right hand surface 28 being shown), the control mechanism brings the table 10 and, thereby, the work piece 11 to a stop, while causing the grinding wheels to move along the said curved surfaces.

When the grinding wheels have reached the end of these curved surfaces, the control mechanism again prevents any movement in longitudinal and/or transverse direction of the grinding wheels, while simultaneously causing the work piece to move in rightward direction, with regard to Figure 7. The grinding wheels then machine the surfaces 97 and 97a respectively.

When the grinding wheels reach the left hand end of these surfaces so that they are about to machine the adjacent curved surfaces of the work piece, the control mechanism again brings the work piece supporting table and, thereby, the work piece to a halt, while simultaneously causing the grinding wheels to perform a combined longitudinal and transverse movement with regard to the work piece so that the periphery of the grinding wheels moves along the adjacent curved surfaces.

When the grinding wheels have reached the end of these last mentioned curved surfaces, they are about in the same position at which they started, however, with the difference that the control mechanism, near the end of the complete cycle of the grinding wheels, has fed the latter further into the material of the work piece so that the grinding wheels, when starting the next cycle, will take off further material from the work piece.

When the grinding wheels have sufficiently machined the work piece, the part of the control mechanism, effecting the feeding of the grinding wheels toward the work piece, is made inoperative, and the grinding wheels are caused to move through a further or idle cycle, at which they will merely smooth out any step in the material which may have been caused by the feeding mechanism, so that, at the end of this idling cycle, all machined surfaces will be smooth without any undue step therein.

The grinding wheels are then moved away from the work piece, whereupon the work piece supporting table, with the work piece, is moved outwardly toward the unloading position. After the work piece has been unloaded, the operator actuates a dressing device for redressing the grinding wheels.

When this dressing operation has been completed, the dressing mechanism is again moved away from the grinding wheels, whereupon a new work piece, on the work piece table, is brought into machining position, and a new machining cycle is initiated.

While the invention has been described in connection with a grinding machine, it is, of course, to be understood that the invention is by no means limited to such a machine, but may also be used in connection with other machine tools, for instance, milling machines, in which the machining tool performs an operation similar to that described above in connection with the grinding wheels 20 and 20a.

It will be understood that I desire to comprehend within my invention such modifications as come within the scope of the claims and the invention.

Having thus fully described my invention, what I claim as new and desire to secure by Letters Patent, is:

1. In a machine tool, a reciprocable support adapted to support a work piece, means for reciprocating said support, a tool holder adapted to receive a tool for machining said work piece, a rotary member for rotatably supporting said tool holder, said tool holder being movable from a position concentric with said rotary member to a position eccentric thereto and vice versa, a segmental gear connected to said rotary member, fluid operable rack means adapted to mesh with said gear for rotating the same and, thereby, said rotary member, means responsive to a predetermined movement of said work piece support for hydraulically actuating said rack means to bring about a rotative movement of said rotary member by a predetermined angle, and means for hydraulically locking said rack means and, thereby, said gear in response to the movement of said rotary member by said predetermined angle.

2. In a machine tool, a reciprocable work piece support, means for reciprocating said support, a rotary member, tool holder means slidable on said rotary member and adjustable from a position concentric therewith to a position eccentric thereto and vice versa, means for effecting said adjustment, and a fluid operable cylinder-piston-assembly operatively connected with said rotary member for rotating the latter in one and the same direction in response to the completion of each stroke of said work piece support, said cylinder-piston-assembly comprising two reciprocable racks meshing with a segmental gear connected to said rotary member and provided with a cutaway portion adapted to allow movement of one of said racks without actuating said gear while the latter is engaged by the other rack.

3. In a machine tool, a reciprocable work piece support, tool holder means, supporting means for supporting said tool holder means, fluid operable means operatively connected with said supporting means for moving said tool holder means selectively toward or away from said work piece support, said supporting means including a main slide carrying said tool holder means and an auxiliary slide on said main slide for operatively connecting said fluid operable means with said main slide, and means operable selectively to vary the relative position between said fluid operable means on one hand, and said auxiliary and main slides on the other hand.

4. In a machine tool, a reciprocable work piece support, means for reciprocating said work piece support, tool holder means movable in a direction transverse to the direction of movement of said work piece support, a rotatable tool with a relatively long shaft supported by and extending from said tool holder means, a sleeve connected to and surrounding that portion of the shaft extending from said tool holder means, a hollow extension connected to said tool holder means and surrounding said sleeve, and anti-friction bearings interposed between said hollow extension and said sleeve for rotatably supporting the latter.

5. In a machine tool, a reciprocable work piece support, means for reciprocating said work piece support, tool holder means movable in a direction transverse to the direction of movement of said work piece support, a rotatable tool with a relatively long shaft supported by and extending from said tool holder means, a sleeve connected to and surrounding that portion of the shaft extending from said tool holder means, a hollow extension connected to said tool holder means and surrounding said sleeve, anti-friction bearings interposed between said hollow extension and said sleeve for rotatably supporting the latter, and means operable from the outside of said hollow extension for connecting said anti-friction bearings to said sleeve.

6. In a machine tool, a reciprocable work piece support, means for reciprocating said support, a rotary member, tool holder means supported by said rotary member and adjustable relative thereto from a position concentric therewith to a position eccentric thereto and vice versa, means for moving said rotary member selectively toward or away from said work piece support in a direction transverse to the direction of movement of said work piece support, fluid operable means including two fluid operable cylinder-piston-assemblies for rotating said rotary member, valve means for controlling the movement of said cylinder-piston-assemblies, fluid pressure responsive means associated with said valve means for bringing about a change in the position of said valve means, and conduit means interconnecting said cylinder-piston-assemblies and said fluid pressure responsive means, and controlled by the pistons of said cylinder-piston-assemblies.

7. In a machine tool, a reciprocable work piece support, hydraulic motor means for reciprocating said support, electrically controlled valve means for controlling the flow of fluid to and from said hydraulic motor means, tool holder means movable in a direction transverse to the direction of movement of said work piece support, fluid operable means operable selectively to cause said tool holder means to perform a predetermined stroke along a curved line, first electric controlling means responsive to a predetermined movement of said work piece support in either direction for causing said support to stop, and second electric controlling means operable in response to the completion of said predetermined stroke by said tool holder means along said curved line for reversing the electrically controlled valve means, and changing the state of energization of said first electric controlling means, to thereby cause said work piece support to perform a predetermined movement in the opposite direction.

8. In a machine tool, a work piece support, fluid operable motor means selectively moving said support from an unloading position into a first predetermined machining position, and for reciprocating said support between said first predetermined position and a second predetermined position, tool holder means movable selectively into operative or inoperative position, switch means operable by actuating means connected to said support for reversing the flow of pressure fluid to said motor means, said switch means being arranged intermediate said first and second predetermined positions and being movable selectively into operative or inoperative position, and means responsive to the movement of said switch means into operative position following the movement of said support into said first predetermined position to initiate a working cycle of the machine tool.

9. In a machine tool, a work piece support, fluid operable motor means selectively moving said support from an unloading position into a first predetermined machining position, and for reciprocating said support between said first predetermined position and a second predetermined position, tool holder means movable selectively into operative or inoperative position, switch means operable by actuating means connected to said support for reversing the flow of pressure fluid to said motor means, said switch means being arranged intermediate said first and second positions, and being movable selectively into operative or inoperative position, means responsive to the movement of said switch means into operative or inoperative position following the movement of said support into said first predetermined position to initiate a working cycle of the machine tool, and control means operatively connected with said switch means and operable in response to the actuation thereof at said first and second predetermined positions for temporarily preventing operation of said motor means.

10. In a machine tool, a work piece support, fluid operable motor means selectively moving said support from an unloading position into a first predetermined machining position, and for reciprocating said support between said first predetermined position and a second predetermined position, tool holder means movable selectively into operative or inoperative position, switch means operable by actuating means connected to said support for reversing the flow of pressure fluid to said motor means, said switch means being arranged intermediate said first and second predetermined positions, and being movable selectively into operative or inoperative position, means responsive to the movement of said switch means into operative position following the movement of said support into said first predetermined position to initiate a working cycle of the machine tool, control means operatively connected with said switch means and operable in response to the actuation thereof at said first and second predetermined positions for temporarily preventing operation of said motor means, and means responsive to the actuation of said control means for moving said tool holder means through a predetermined curved path.

11. In a machine tool, a reciprocable work piece, a tool holder, means for moving the tool holder first toward the work piece on said work piece support and later, away from the work piece, means for holding the tool holder temporarily stationary and simultaneously causing the work piece to move past the tool on the holder, means for holding the work piece stationary and simultaneously causing the tool holder to move through a predetermined distance along a curved line, a hydraulically operable motor means for respectively actuating said work piece support and said tool holder means, and electric control means for controlling the operation of said motor means to give each of the work piece support and the tool holder means their respective movements in proper time sequence, said electric control means also serving to cause the tool holder means to move away from the work piece on completion of the work on the work piece.

12. In a machine tool, a reciprocable work piece support, tool holder means movable toward and away from the work piece on said work piece support, hydraulic operating means for first moving the tool holder means toward the work piece, hydraulic operating means for holding the tool holder temporarily stationary and simultaneously causing the work piece support to move with respect to the tool holder, a hydraulic operating means for later holding the work piece support temporarily stationary while causing the tool holder means to move with respect to said support, and electric control means for controlling each of said hydraulic operating means to give the work piece support and the tool holder means the functions set forth in the predetermined sequence, said electric control means also serving to cause the tool holder means to move away from the work piece on completion of the work done on the work piece.

13. In a machine tool, a reciprocable work piece support, tool holder means adapted selectively to be moved toward or away from the work piece on said work piece support, hydraulic operating means arranged so as to hold the tool holder means temporarily stationary and for simultaneously moving the work piece support with respect to the tool holder means, hydraulic operating means for then holding the work piece support temporarily stationary while simultaneously moving the tool holder means along the curved line, said hydraulic operating means in combination serving later to hold the tool holder means temporarily stationary while simultaneously causing the work piece support to move with respect thereto and finally, causing the work piece support to be held temporarily stationary while the tool holder means is caused simultaneously to move along a curved line to bring the tool holder means back to its original position with respect to the work piece support, said hydraulic means in combination also serving to move the tool holder means away from the work piece on conclusion of the work done on said work piece, and electric control means for controlling all of said hydraulic operating means in order to give the work piece support and the tool holder means the various functions set forth in the predetermined sequence.

14. In a machine tool, a rotary grinding wheel and an electric motor for rotating said wheel, said wheel being movable selectively toward or away from a work piece, a work piece support, hydraulic operating means for holding the axis of the grinding wheel temporarily stationary while the work piece support is moved past said grinding wheel, hydraulic operating means for maintaining the work piece support temporarily stationary while simultaneously causing the axis of the grinding wheel to be moved along a curved line and hydraulic operating means for moving the grinding wheel into work piece engaging position and when the work has been accomplished thereto move the grinding wheel out of work engaging position, and electrical control means for controlling the operation of each of said hydraulic operating means in the predetermined sequence.

JOHN C. WILSON.